(12) United States Patent
Lee et al.

(10) Patent No.: US 12,413,276 B2
(45) Date of Patent: Sep. 9, 2025

(54) COMMUNICATION METHOD AND DEVICE IN BEAMFORMING-BASED WIRELESS COMMUNICATION SYSTEM SUPPORTING PLURALITY OF FREQUENCY BANDS

(71) Applicant: Samsung Electronics Co., Ltd., Suwon-si (KR)

(72) Inventors: Sangho Lee, Suwon-si (KR); Byounghoon Jung, Suwon-si (KR); Jungsoo Jung, Suwon-si (KR); Jiyoung Cha, Suwon-si (KR); Jinho Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 146 days.

(21) Appl. No.: 18/262,147

(22) PCT Filed: Jan. 12, 2022

(86) PCT No.: PCT/KR2022/000571
§ 371 (c)(1),
(2) Date: Jul. 19, 2023

(87) PCT Pub. No.: WO2022/158786
PCT Pub. Date: Jul. 28, 2022

(65) Prior Publication Data
US 2024/0080075 A1 Mar. 7, 2024

(30) Foreign Application Priority Data
Jan. 25, 2021 (KR) .......................... 10-2021-0010423

(51) Int. Cl.
*H04B 7/06* (2006.01)
*H04B 7/08* (2006.01)

(52) U.S. Cl.
CPC ......... *H04B 7/0617* (2013.01); *H04B 7/0695* (2013.01); *H04B 7/088* (2013.01)

(58) Field of Classification Search
CPC .... H04B 7/0617; H04B 7/0695; H04B 7/088; H04B 7/06; H04B 7/08; H04B 17/318;
(Continued)

(56) References Cited

U.S. PATENT DOCUMENTS

2006/0104382 A1 5/2006 Yang et al.
2013/0223251 A1 8/2013 Li et al.
(Continued)

FOREIGN PATENT DOCUMENTS

KR 10-2006-0037194 A 5/2006
KR 10-2014-0129051 A 11/2014
(Continued)

OTHER PUBLICATIONS

International Search Report and Written Opinion of the International Searching Authority dated Apr. 15, 2022, in connection with International Application No. PCT/KR2022/000571, 9 pages.
(Continued)

*Primary Examiner* — Jean B Corrielus

(57) ABSTRACT

The present disclosure relates to a communication method and device in a beamforming-based wireless communication system supporting a plurality of frequency bands, the communication method for a terminal, according to an embodiment of the present disclosure, comprising the steps of: performing a beam search using a plurality of first reception beams in a first frequency band and receiving a synchronization signal block (SSB) comprising first information about a base station provided at the same location; performing, on the basis of the first information, a beam search for a plurality of second reception beams in a second frequency band belonging to a subset of the first reception beams that
(Continued)

received the SSB in the first frequency band; and communicating with the base station in the second frequency band by selecting an optimal pair of transmission and reception beams as result of the beam search for the plurality of second reception beams.

14 Claims, 14 Drawing Sheets

(58) Field of Classification Search
CPC ....... H04B 7/086; Y02D 30/70; H04W 72/04; H04W 72/0453; H04W 72/046
See application file for complete search history.

(56) References Cited

U.S. PATENT DOCUMENTS

| | | |
|---|---|---|
| 2013/0286960 A1 | 10/2013 | Li et al. |
| 2019/0013983 A1 | 1/2019 | Gao et al. |
| 2019/0200337 A1* | 6/2019 | Zhou ................... H04L 5/0055 |
| 2019/0207636 A1 | 7/2019 | Luo et al. |
| 2019/0239092 A1 | 8/2019 | Zhou et al. |
| 2019/0268114 A1* | 8/2019 | Kang ....................... H04B 7/06 |
| 2019/0373439 A1 | 12/2019 | Abouelseoud et al. |
| 2020/0162938 A1 | 5/2020 | Ansari et al. |
| 2022/0116924 A1* | 4/2022 | Takeda .................. H04W 76/15 |
| 2023/0008786 A1* | 1/2023 | Karjalainen ....... H04B 7/06954 |
| 2024/0064529 A1* | 2/2024 | Muruganathan ....... H04B 7/024 |

FOREIGN PATENT DOCUMENTS

| | | |
|---|---|---|
| KR | 10-2015-0015447 A | 2/2015 |
| KR | 10-2019-0047194 A | 5/2019 |

OTHER PUBLICATIONS

Ali, et al., "Millimeter Wave Beam-Selection Using Out-of-Band Spatial Information," IEEE Transactions on Wireless Communications, vol. 17, Issue 2, Nov. 2017, 30 pages.

* cited by examiner

COMMUNICATION METHOD AND DEVICE IN BEAMFORMING-BASED WIRELESS COMMUNICATION SYSTEM SUPPORTING PLURALITY OF FREQUENCY BANDS

CROSS-REFERENCE TO RELATED APPLICATIONS

This application is a U.S. National Phase Entry of PCT International Application No. PCT/KR2022/000571, which was filed on Jan. 12, 2022, and claims priority to Korean Patent Application No. 10-2021-0010423 which were filed in the Korean Intellectual Property Office on Jan. 25, 2021, the entire disclosures of each of which are incorporated herein by references.

TECHNICAL FIELD

The disclosure relates to a method and apparatus for selecting a reception beam in a beamforming-based wireless communication system.

BACKGROUND ART

Considering the development of wireless communication from generation to generation, the technologies have been developed mainly for services targeting humans, such as voice calls, multimedia services, and data services. Following the commercialization of 5G ($5^{th}$-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G ($6^{th}$-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz (THz) band (for example, 95 GHz to 3THz bands). It is expected that, due to severer path loss and atmospheric absorption in the terahertz bands than those in millimeter wave (mmW) bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

DETAILED DESCRIPTION OF THE INVENTION

Technical Problem

The disclosure provides an efficient communication method and apparatus in a beamforming-based wireless communication system supporting a plurality of frequency bands.

The disclosure provides a method and apparatus for efficiently selecting/determining a reception beam in a beamforming-based wireless communication system supporting a plurality of frequency bands.

Further, the disclosure provides a method and apparatus for reducing a search time for a reception beam in a wireless communication system supporting an mmW band and a THz band.

The disclosure provides a method and apparatus for selecting/determining a reception beam during handover in a wireless communication system supporting a plurality of frequency bands.

Further, the disclosure provides a method and apparatus for cell measurement in a wireless communication system supporting an mmW band and a THz band.

Technical Solution

A communication method of a base station (BS) in a beamforming-based wireless communication system supporting a plurality of frequency bands according to an embodiment of the disclosure includes transmitting each of synchronization signal blocks (SSBs) including first information about a BS installed at a co-location through a plurality of first transmission beams having different directions in a first frequency band, and performing, using a transmission beam in a second frequency band, communication with a user equipment (UE) for which an optimal transmission/reception beam pair in the second frequency band having a higher frequency than the first frequency band is determined based on the first information.

Further, a BS in a beamforming-based wireless communication system supporting a plurality of frequency bands according to an embodiment of the disclosure includes a transceiver transmitting and receiving signals using beamforming, and a processor configured to transmit each of SSBs including first information about a BS installed at a co-location through a plurality of first transmission beams having different directions in a first frequency band, through the transceiver, and perform, using a transmission beam in a second frequency band through the transceiver, communication with a UE for which an optimal transmission/reception beam pair in the second frequency band having a higher frequency than the first frequency band is determined based on the first information.

Further, a communication method of a UE in a beamforming-based wireless communication system supporting a plurality of frequency bands according to an embodiment of the disclosure includes receiving an SSB including first information about a BS installed at a co-location by performing a beam search using a plurality of first reception beams in a first frequency band, performing a beam search on a plurality of second reception beams in a second frequency band belonging to a subset of a first reception beam through which the SSB is received in the first frequency band, based on the first information, and communicating with the BS in the second frequency band by selecting an optimal transmission/reception beam pair as a result of the beam search on the plurality of second reception beams.

Further, a UE in a beamforming-based wireless communication system supporting a plurality of frequency bands, the UE includes a transceiver transmitting and receiving signals using beamforming, and a processor configured to receive an SSB including first information about a BS installed at a co-location by perform a beam search using a plurality of first reception beams in a first frequency band, through the transceiver, perform a beam search on a plurality of second reception beams in a second frequency band belonging to a subset of a first reception beam through which the SSB is received in the first frequency band, based on the first information, and communicate with the BS in the second frequency band by selecting an optimal transmission/reception beam pair as a result of the beam search on the plurality of second reception beams, through the transceiver.

MODE FOR CARRYING OUT THE INVENTION

Figure 1A:
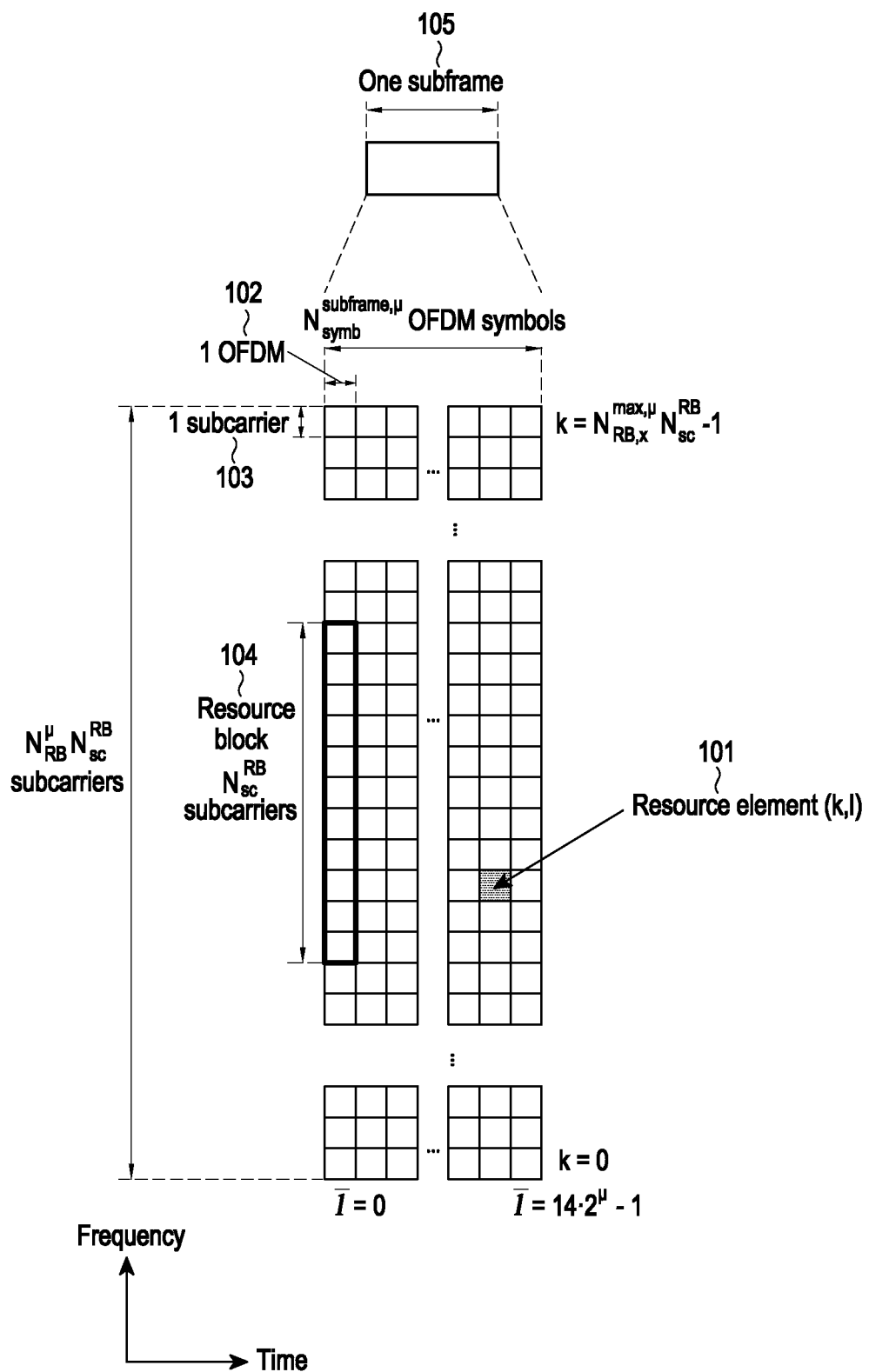
FIG. 1A is a diagram illustrating the basic structure of a time-frequency domain, which is a radio resource area carrying data or a control channel in a 5th generation (5G) system.

An embodiment of the disclosure will be described in detail with reference to the attached drawings.

A description of a technology which is well known in the technical field of the disclosure and is not directly related to the disclosure will be avoided lest it should obscure the subject matter of the disclosure. This is intended to clarify the subject matter of the disclosure without obscuring it by omitting an unnecessary description.

For the same reason, some components are exaggerated, omitted, or schematically illustrated in the attached drawings. Further, the drawn size of each component does not exactly reflect its real size. In each drawing, the same reference numerals are assigned to the same or corresponding components.

The advantages and features of the disclosure, and a method of achieving them will become apparent from reference to embodiments described below in detail in conjunction with the attached drawings. However, the disclosure may be implemented in various manners, not limited to the embodiments set forth herein. Rather, these embodiments are provided such that the disclosure is complete and thorough and its scope is fully conveyed to those skilled in the art, and the disclosure is only defined by the appended claims. Further, lest it should obscure the subject matter of the disclosure, a detailed description of a related function or configuration will be avoided in describing the disclosure. Although the terms described later are defined in consideration of functions in the disclosure, the terms may be changed according to the intention of a user or an operator, or customs. Therefore, the definitions should be made by the meanings of each term lying within.

In the disclosure, a base station (BS) may be, as an entity responsible for resource allocation for a user equipment (UE), at least one of various radio access units including a gNode B, a gNB, an eNode B, an eNB, a Node B, and a satellite, a BS controller, or a network node. Further, the BS may be a network entity including at least one of an integrated access and backhaul (IAB)-donor which is a gNB providing network access to a UE through backhaul and access links or an IAB-node which is a radio access network (RAN) node supporting new radio (NR) access link(s) to UE(s) and supporting NR backhaul links to the IAB-donor or another IAB-node in a 5G system (NR system). A UE may and transmit and receive data to and from an IAB-donor wirelessly connected to the UE through an IAB-node and connected to at least one IAB-node through a backhaul link.

A terminal may include a UE, a mobile station (MS), a cellular phone, a smartphone, a computer, or a multimedia system capable of performing a communication function. In the disclosure, downlink (DL) is a wireless transmission path in which a BS transmits a signal to a UE, and uplink (UL) is a wireless transmission path in which a UE transmits a signal to a BS. While the following description may be given in the context of an LTE or LTE-A system, an embodiment of the disclosure is also applicable to other communication systems having a similar technical background or channel format. For example, a 5G (NR) mobile communication technology developed after LTE-A may be included in the communication systems. Hereinbelow, 5G may be a concept covering legacy LTE, LTE-A, and other similar services. Further, the disclosure may also be applied to other communication systems through some modifications made without greatly departing from the scope of the disclosure.

It will be understood that each block of the flowchart illustrations and combinations of the flowchart illustrations may be implemented by computer program instructions. These computer program instructions may be loaded on a processor of a general purpose computer, special purpose computer, or other programmable data processing equipment, such that the instructions, which are executed via the processor of the computer or other programmable data processing equipment, create means for implementing the functions specified in the flowchart block(s). These computer program instructions may also be stored in a computer-usable or computer-readable memory that may direct the computer or other programmable data processing equipment to function in a particular manner, such that the instructions stored in the computer-usable or computer-readable memory produce an article of manufacture including instruction means which implement the function specified in the flowchart block(s). The computer program instructions may also be loaded onto the computer or other programmable data processing equipment to cause a series of operations to be performed on the computer or other programmable data processing equipment to produce a computer implemented process such that the instructions which are executed on the computer or other programmable equipment provide operations for implementing the functions specified in the flowchart block(s).

Furthermore, each block may represent part of a module, a segment, or code including one or more executable instructions for performing specific logic function(s). Moreover, it should be noted that the functions of the blocks may be performed in a different order in several alternative modified implementations. For example, two successive blocks may be performed substantially at the same time, or may be performed in reverse order according to their functions.

The term 'unit or part' as used herein means, but is not limited to, a software or hardware component, such as a field programmable gate array (FPGA) or application specific integrated circuit (ASIC). A 'unit or part' may be configured to play certain roles. However, a 'unit or part' is not limited to software or hardware. A 'unit or part' may be configured to reside on an addressable storage medium and configured to be executed on one or more processors. Thus, a 'unit or part' includes components, such as software components, object-oriented software components, class components and task components, processes, functions, attributes, procedures, subroutines, segments of program code, drivers, firmware, microcode, circuitry, data, databases, data structures, tables, arrays, and variables. The functionality provided in the components and 'units' may be combined into fewer components and 'units' or further separated into additional components and 'units'. In addition, the components and 'units' may be implemented such that they are executed on one or more central processors (CPUs) in a device or a secure multimedia card. Further, a 'unit or part' may include one or more processors and/or devices.

Beyond the initial voice-centered service, wireless communication systems are evolving into broadband wireless communication systems that provide high-speed, high-quality packet data services. A representative example of the broadband wireless communication systems, LTE adopts orthogonal frequency division multiplexing (OFDM) for DL and single carrier frequency division multiple access (SC-FDMA) for UL. UL refers to a radio link on which a UE (or MS) transmits data or a control signal to a BS (e.g., an eNode B), and DL refers to a radio link on which a BS transmits data or a control signal to a UE. In the above multiple access schemes, data or control information of each user may be identified by allocating and operating time-frequency resources to carry the data or the control information in such a manner that they do not overlap, that is, orthogonality is established between them.

The post LTE communication system, that is, the 5G communication system providing communication services at present may support various requirements of users and service providers. Services considered for the 5G communication system include enhanced mobile broadband (eMBB), massive machine type communication (mMTC), ultra reliability low latency communication (URLLC), and so on.

eMBB aims to provide a higher data transmission rate than a data transmission rate supported by legacy LTE, LTE-A, or LTE-Pro. For example, eMBB should be able to provide up to 20 Gbps on DL and up to 10 Gbps on UL from the viewpoint of one BS in the 5G communication system. Further, the 5G system should provide an increased user-perceived data rate as well as a maximum transmission rate.

To satisfy this requirement, various transmission/reception techniques need improvement, including advanced multiple input multiple output (MIMO) transmission technology. In addition, use of a wider frequency bandwidth than 20 MHz used in current LTE in a frequency band at 3 to 6 GHz or above 6 GHz may satisfy the data transmission rate required for the 5G communication system.

In the 5G communication system, mMTC is also considered to support application services such as Internet of things (IoT). In order to efficiently provide IoT, mMTC may require massive UE access support, improved UE coverage, an improved battery life, and reduced UE cost in a cell. Since IoT provides a communication function through attachment to various sensors and various devices, IoT should be able to support a large number of UEs (e.g., 1,000,000 UEs/km2) within a cell. In addition, since a UE supporting mMTC is highly likely to be located in a shaded area that the cell does not cover such as the basement of a building in view of the nature of the service, it may require wider coverage compared to other services provided by the 5G communication system. The UE supporting mMTC should be configured as a low-cost UE, and since it is difficult to frequently exchange the battery of the UE, a very long battery life time may be required.

Finally, URLLC, which is a cellular-based wireless communication service serving a specific (mission-critical) purpose, is used for remote control of a robot or a machine, industrial automation, unmanned aerial vehicles, remote healthcare, emergency alert, and so on, and should provide ultra-low latency and ultra-reliability communication. For example, a service supporting URLLC should satisfy an air interface latency less than 0.5 ms and has a requirement of a packet error rate of $10^{-5}$ or less. Therefore, for a service supporting URLLC, the 5G system should provide a smaller transmit time interval (TTI) than other services, and has a design requirement of allocation of wide resources in a frequency band.

The three services of 5G, that is, eMBB, URLLC, and mMTC may be multiplexed and transmitted in one system. To satisfy different requirements of the services, different transmission/reception techniques and transmission/reception parameters may be used for the services. Obviously, 5G is not limited to the above-described three services.

For convenience of description, some of the terms and names defined in the 3GPP standards (5G, NR, LTE, or similar system standards) may be used below. However, the disclosure is not limited by the terms and the names, and may equally be applied to systems conforming to other standards. Further, terms identifying access nodes, terms for network entities, terms for messages, terms for interfaces between network entities, and various types of identification information are presented for convenience of description. Therefore, the disclosure is not limited to the terms used in this disclosure, which may be replaced with other terms that refer to objects having equivalent technical meanings.

With reference to FIGS. 1A to 1D, a basic structure of a 5G system using an mmW band, a synchronization signal (SS)/PBCH block (a synchronization signal block (SSB)) carrying an MIB, and a beamforming scheme will be described below for better understanding of the disclosure.

FIG. 1A is a diagram illustrating a basic structure of a time-frequency domain, which is a radio resource area carrying data or a control channel in a 5G system.

In FIG. 1A, a horizontal axis represents a time domain and a vertical axis represents a frequency domain. A basic unit of resources in the time and frequency domains is a resource element (RE) 101, which may be defined as one OFDM symbol 102 on the time axis and one subcarrier 103 on the frequency axis. In the frequency domain, $N_{SC}^{RB}$ (e.g., 12) consecutive REs may form one resource block (RB) 104. In FIG. 1, $N_{symb}^{subframe,\mu}$ is the number of OFDM symbols per subframe 105 for a subcarrier spacing configuration μ, and TS 38.211 section 4 may be referred to for a detailed description of the resource structure in the 5G system.

Figure 1B:
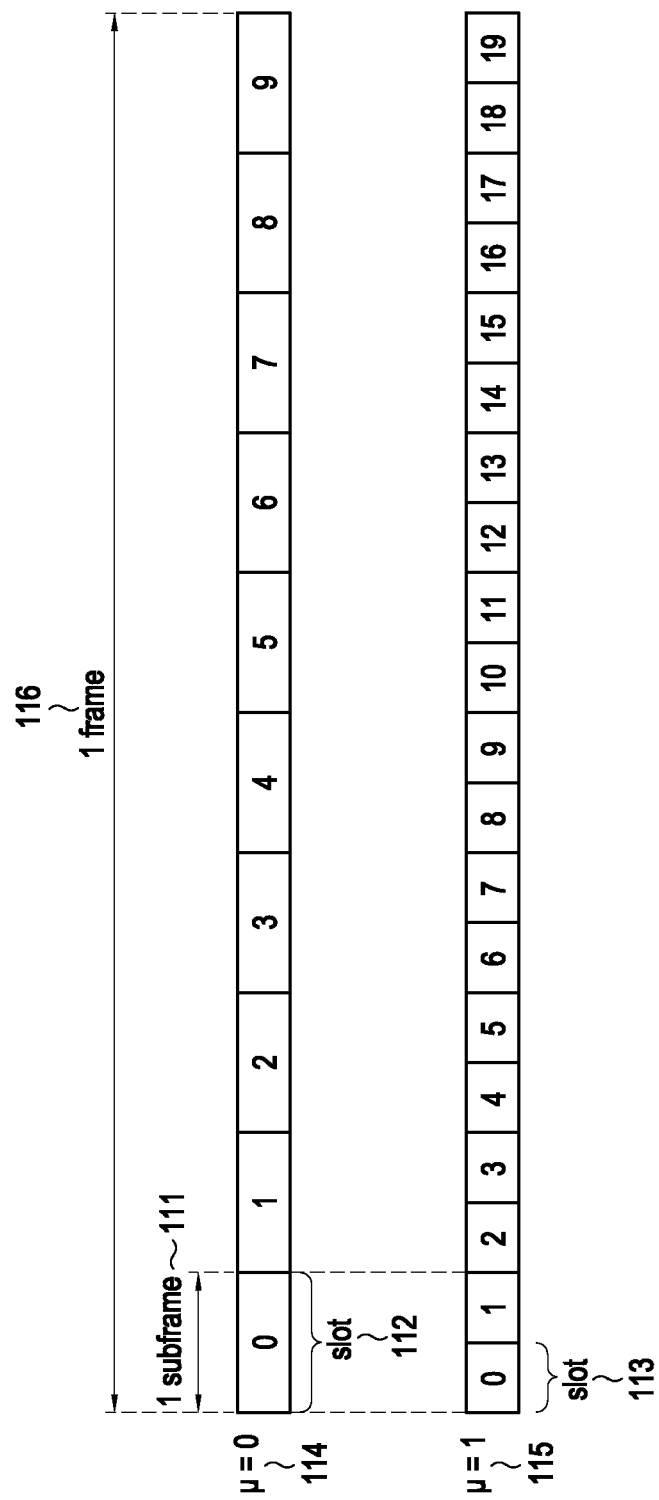
FIG. 1B is a diagram illustrating a slot structure considered in a 5G system.

FIG. 1B is a diagram illustrating a slot structure considered in the 5G system.

FIG. 1B illustrates an example of the structures of a frame 116, a subframe 111, and slots 112 and 113. One frame 116 may be defined to be 10 ms. One subframe 111 may be defined to be 1 ms, and thus one frame 116 may include a total of 10 subframes 111. One slot 112 or 113 may be defined to be 14 OFDM symbols (i.e., the number of symbols per slot $N_{symb}^{slot}$=14). One subframe 111 may include one or more slots 112 or 113, and the number of slots 112 or 113 per subframe 111 may vary depending on a configuration value μ 114 or 115 for a subcarrier spacing. In the example of FIG. 1B, a case where μ=0 114 and a case where μ=1 115 are shown as subcarrier spacing configuration values. When μ=0 114, one subframe 111 may include one slot 112, and when μ=1 115, one subframe 111 may include two slots 113. That is, the number $N_{slot}^{subframe,\mu}$ of slot of slots per subframe may vary according to the configuration value μ for the subcarrier spacing, and accordingly, the number $N_{slot}^{frame,\mu}$ of slot of slots per frame may vary. According to each subcarrier spacing configuration μ, $N_{slot}^{subframe,\mu}$ and $N_{slot}^{frame,\mu}$ may be defined as listed in [Table 1] below.

TABLE 1

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Next, a bandwidth part (BWP) configuration in the 5G communication system will be described in detail with reference to the drawings.

Figure 1C:
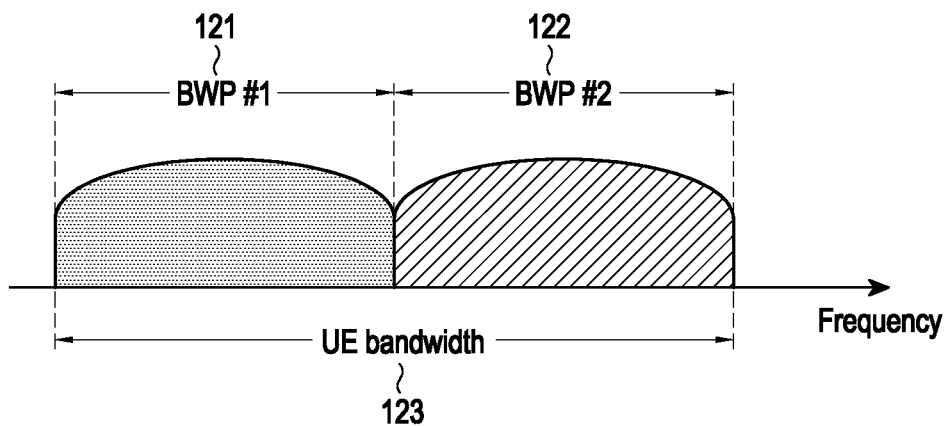
FIG. 1C is a diagram illustrating an exemplary bandwidth part (BWP) configuration in a 5G system.

FIG. 1C is a diagram illustrating an exemplary BWP configuration in the 5G system.

FIG. 1C illustrates an example in which a UE bandwidth 123 is configured as two BWPs, that is, BWP #1 121 and BWP #2 122. A BS may configure one or more BWPs for a UE and configure the following information for each BWP.

TABLE 2

| BWP ::= | SEQUENCE { |
|---|---|
| bwp-Id | BWP-Id, |
| (bandwidth part identity) | |
| locationAndBandwidth | INTEGER (1..65536), |
| (bandwidth part location) | |

TABLE 2-continued

| | |
|---|---|
| subcarrierSpacing (Subcarrier spacing) | ENUMERATED {n0, n1, n2, n3, n4, n5}, |
| cyclicPrefix (cyclic prefix) | ENUMERATED { extended } |
| } | |

In [Table 2], "locationAndBandwidth" represents the location and bandwidth of the BWP in the frequency domain, "subcarrierSpacing" represents a subcarrier spacing to be used in the BWP, and "cyclicPrefix" represents whether an extended cyclic prefix (CP) is used in the BWP.

Obviously, the disclosure is not limited to the above example, and various parameters related to the BWP may be configured for the UE in addition to the configuration information. The information may be transmitted to the UE through higher layer signaling, for example, radio resource control (RRC) signaling by the BS. At least one BWP among one or more configured BWPs may be activated. Whether a configured BWP is activated may be semi-statically indicated to the UE through RRC signaling or dynamically indicated through downlink control information (DCI) by the BS.

Before an RRC connection, the UE may be configured with an initial BWP for initial access through a master information block (MIB) by the BS. Specifically, the UE may receive configuration information about a control resource set (CORESET) and a search space in which a physical downlink control channel (PDCCH) carrying system information (remaining system information (RMSI) or system information block 1 (SIB1)) required for initial access may be transmitted, through the MIB during the initial access. That is, the UE may receive the MIB through the BS without performing an attach procedure for initial access.

The CORESET and the search space configured through the MIB may be considered to have identity (ID) 0 (e.g., CORESET #0, search space #0). The CORESET and the search space configured through the MIB may be referred to as a common CORESET and a common search space, respectively. The BS may notify the UE of configuration information such as frequency allocation information, time allocation information, and a numerology for CORESET #0 through the MIB. In addition, the BS may notify the UE of configuration information about a monitoring period and a monitoring occasion for CORESET #0, that is, configuration information about search space #0 by the MIB. The UE may consider a frequency area configured as CORESET #0 obtained from the MIB to be an initial BWP for initial access. The ID of the initial BWP may be regarded as 0. The CORESET may be referred to as a control region or a control resource region.

BWP configurations supported by 5G may be used for various purposes.

According to some embodiments, when the UE supports a bandwidth narrower than a system bandwidth, the bandwidth supported by the UE may be supported through a BWP configuration. For example, the BS may allow the UE to transmit and receive data at a specific frequency location within the system bandwidth by configuring the frequency location of the BWP for the UE.

Further, according to an embodiment, the BS may configure a plurality of BWPs for the UE to support different numerologies. For example, to support both data transmission and reception using a subcarrier spacing of 15 kHz and a subcarrier spacing of 30 kHz for a UE, two BWPs may be configured with the subcarrier spacings of 15 kHz and 30 kHz, respectively. The different BWPs may be multiplexed in frequency division multiplexing (FDM), and when data is to be transmitted and received at a specific subcarrier spacing, a BWP configured with the subcarrier spacing may be activated.

Further, according to an embodiment, the BS may configure BWPs having different bandwidths for the UE to reduce power consumption of the UE. For example, when the UE supports a very large bandwidth, for example, a bandwidth of 100 MHz and always transmits and receives data in the bandwidth, very large power consumption may occur. In particular, monitoring an unnecessary DL control channel in the large bandwidth of 100 MHz in a non-traffic situation may be very inefficient in terms of power consumption. For the purpose of reducing power consumption of the UE, the BS may configure a BWP of a relatively narrow bandwidth, for example, a 20 MHz BWP for the UE. In a situation where there is no traffic, the UE may perform a monitoring operation in the 20 MHz BWP, and when data is generated, the UE may transmit and receive data in the 100 MHz BWP according to an instruction from the BS.

In the BWP configuration method, before an RRC connection, a UE may receive configuration information about an initial BWP through an MIB during initial access. More specifically, the UE may be configured with a CORESET for a PDCCH carrying DCI for scheduling an SIB from an MIB transmitted on a physical broadcast channel (PBCH). The bandwidth of the CORESET configured through the MIB may be regarded as an initial BWP, and the UE may receive the SIB through a physical downlink shared channel (PDSCH) in the configured initial BWP. The initial BWP may be used for other system information (OSI), paging, and random access in addition to the purpose of SIB reception.

Now, a description will be given of a synchronization signal (SS)/PBCH block (SSB).

An SSB may mean a physical layer channel block including a primary SS (PSS), a secondary SS (SSS), and a PBCH. Specifically, they are given as follows.

PSS: As a signal serving as a reference signal for DL time/frequency synchronization, the PSS provides partial information of a cell ID.

SSS: The SSS serves as a reference for DL time/frequency synchronization and provides the remaining cell ID information not provided by the PSS. Additionally, the SSS may serve as a reference signal for PBCH demodulation.

PBCH: The PBCH provides essential system information required to transmit and receive a data channel and a control channel of a UE. The essential system information may include search space-related control information indicating radio resource mapping information about a control channel, scheduling control information for a separate data channel carrying system information, and so on.

SS/PBCH block: The SS/PBCH block includes a combination of the PSS, the SSS, and the PBCH. One or more SS/PBCH blocks may be transmitted within 5 ms, and each transmitted SS/PBCH block may be identified by an index.

The UE may detect the PSS and the SSS and decode the PBCH during initial access. The UE may obtain an MIB from the PBCH, and receive CORESET #0 (which may correspond to a CORESET having a CORESET index of 0) in the MIB. For example, the UE assumes that a selected SSB and a demodulation reference signal (DMRS) transmitted in CORESET #0 is quasi co-located (QCLed) and monitors CORESET #0. The UE may receive system information based on DCI transmitted in CORESET #0. The UE may obtain configuration information related to a random access channel (RACH) required for initial access from the received system information. The UE may transmit a physical RACH (PRACH) to the BS in consideration of the index of the selected SSB, and the BS receiving the PRACH may obtain information about the SSB index selected by the UE. The BS may be aware of an SSB that the UE has selected from among SSBs and that the UE monitors CORESET #0 related to the SSB.

In the 5G system, one or more different antenna ports may be associated with each other by a QCL configuration as illustrated in Table 3 below. A TCI state is for notifying/indicating a QCL relationship between a PDCCH (or PDCCH DMRS) and another RS or channel. When it is said that a certain reference antenna port A (reference RS #A) and another target antenna port B (target RS #B) are mutually QCLed, this implies that the UE is allowed to apply some or all of large-scale channel parameters estimated from antenna port A to channel measurement from antenna port B. For QCL, it may be necessary to associate different parameters with each other depending on situations including 1) time tracking affected by an average delay and a delay spread, 2) frequency tracking affected by Doppler shift and Doppler spread, 3) radio resource management (RRM) affected by an average gain, 4) beam management (BM) affected by a spatial parameter. Accordingly, the 5G system supports four types of QCL relationships as listed in Table 3 below.

TABLE 3

| QCL type | Large-scale characteristics |
| --- | --- |
| A | Doppler shift, Doppler spread, average delay, delay spread |
| B | Doppler shift, Doppler spread |
| C | Doppler shift, average delay |
| D | Spatial Rx parameter |

The spatial reception (Rx) parameters may refer to some or all of various parameters including angle of arrival (AoA), power angular spectrum (PAS) of AoA, angle of departure (AoD), PAS of AoD, transmit/receive channel correlation, transmit/reception beamforming, and spatial channel correlation.

In the 5G system, BM refers to performing communication by selecting an optimal transmission (Tx)/reception (Rx) beam pair of a Tx beam at a transmitter and an Rx beam at a receiver. In the initial cell search process, the UE receives an SSB from the BS. In this process, the BS may sequentially transmit a plurality of SSBs using a plurality of different Tx beams, and the UE may measure the received signal strength of each of the plurality of SSBs and detect an optimal Rx beam (e.g., an Rx beam having a largest reception signal strength) by sequentially forming a plurality of Rx beams. The Rx beam detected in this way and the Tx beam transmitting the corresponding SSB become an initial Tx/Rx beam pair. In addition, once the initial Tx/Rx beam pair is selected, an optimal Tx/Rx beam pair may be determined in a beam adjustment procedure using a CSI-RS. In the disclosure, the process of detecting an initial Tx/Rx beam pair may also be understood as a process of detecting an optimal Tx/Rx beam pair.

Figure 1D:
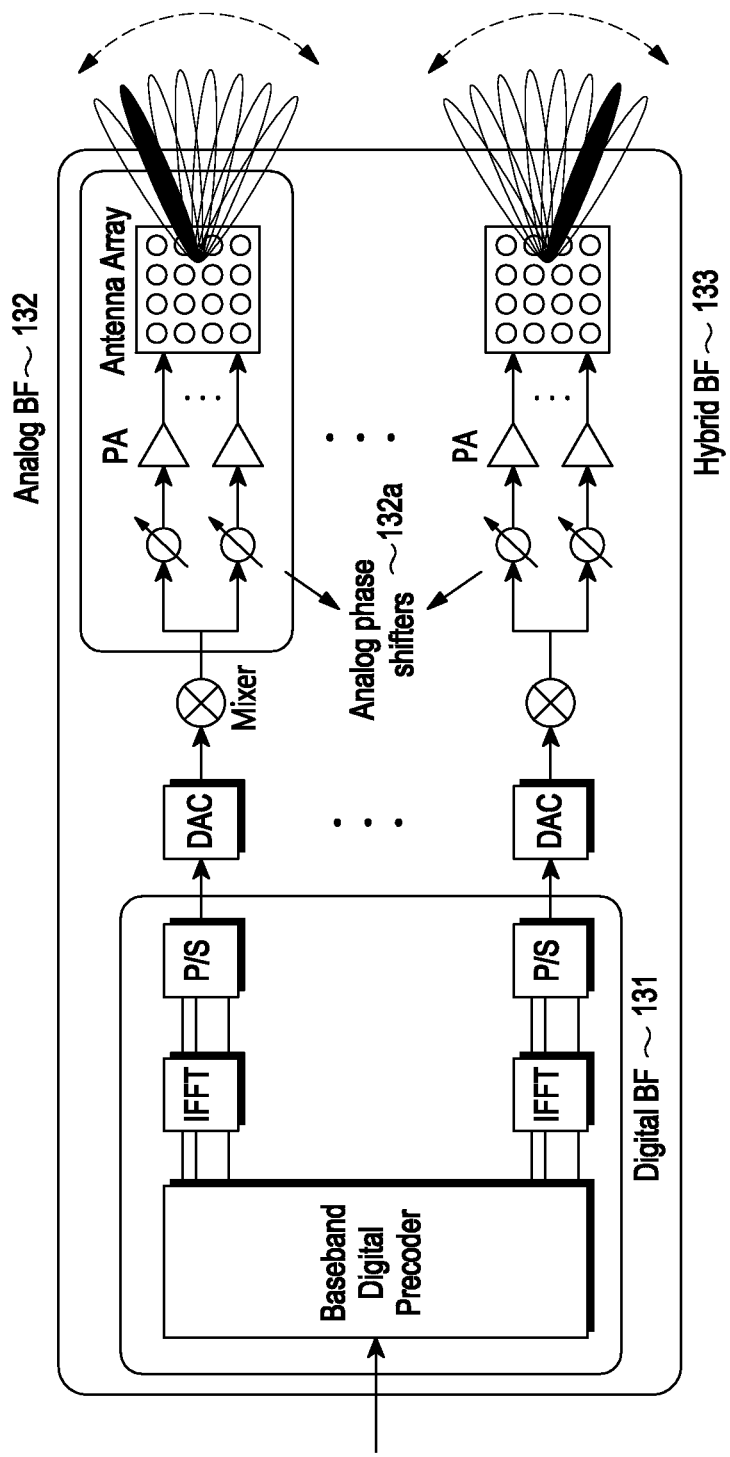
FIG. 1D is a diagram illustrating a beamforming method in a 5G system.

FIG. 1D, which is a diagram illustrating a beamforming method in the 5G system, illustrates exemplary blocks for hybrid beamforming. The hybrid beamforming may be applied to a so-called massive multiple-input and multiple-output (MIMO) technology that may support an improved transmission capacity to multiple users, thereby forming multiple beams.

Referring to FIG. 1D, the 5G system may use hybrid beamforming (BF) 133 that combines digital BF 131 for changing the phase and/or amplitude of a signal through digital signal processing with analog BF 132 for forming analog beams having various beam directions and beam widths by changing the phase and/or amplitude of an analog signal. The hybrid BF technology may provide a large antenna gain, while reducing implementation complexity. As illustrated in the example of FIG. 1D, a block for processing the digital BF 131 may include a baseband digital precoder, an inverse fast Fourier transform (IFFT) unit, and a parallel/serial (P/S) converter. IFFT units and P/S converters may be included in correspondence with the number of radio frequency (RF) chains, and each RF chain may be implemented by including a digital analog converter (DAC) and a mixer. A block for processing the analog BF 132 may include a plurality of analog phase shifters 132a, power amplifiers (PAs), and an antenna array, which are connected to each RF chain. Beam sweeping is possible in a wide range of angles through the plurality of analog phase shifters 132a. The antenna array includes a plurality of antenna elements, and the number of RF chains increases in correspondence with the number of antenna arrays.

In the 5G system, a transmitter that forms a Tx beam may be implemented by including a digital BF block, a plurality of RF chains, and a plurality of analog BF blocks, as described above, and a receiver that receives a signal from the transmitter by forming an Rx beam may be implemented by including a plurality of analog BF blocks, a plurality of RF chains, and a digital BF block corresponding to the configuration of the transmitter.

In the 5G system described above, a BF scheme may be applied to form Tx beams and Rx beams having various directions, beam scan ranges, and beam widths in an mmW band. Hybrid BF is an example, and at least one of digital BF and analog BF may be used to form a Tx beam and an Rx beam. It is also possible to apply at least one of digital BF and analog BF as well as hybrid BF, when a Tx beam and an Rx beam are formed in a THz band according to an embodiment of the disclosure. For example, only analog BF may be used, when initial Tx/Rx beam pairs are selected/determined in the mmW band and the THz band.

In case that a BF technology using an array structure (e.g., an antenna array) with directional antennas is used for wireless communication, the strength of a transmission/reception signal is increased, while a beam width is decreased. That is, the BF technology enables transmission of a signal by concentrating radio waves toward a specific location, and focused reception of a signal propagated from a specific location. Since the beam width is narrow, the performance of wireless communication may vary greatly depending on which location a signal is transmitted to or from which location a signal is received. Therefore, it is important to detect an optimal Tx/Rx beam pair between the BS and the UE to improve performance in wireless communication.

For this beam search, the BS periodically transmits an SS/PBCH block (hereinafter, referred to as an SSB) through a Tx beam, and the UE receives SSBs transmitted through Tx beams in various directions from the BS and determines an optimal Tx/Rx beam pair for SSB reception in an NR system (i.e., 5G system). In an NR system, the BS generally transmits as many SSBs as the number of available Tx beams as a set and periodically transmits the set. Each SSB corresponds to one Tx beam. The UE may measure the received signal strength of each SSB by turning on available Rx beams for the SSB set one by one, and thus detect an optimal Rx beam having a largest received signal strength for a Tx beam corresponding to a corresponding SSB. On the assumption that the number of Tx beams is $N_T$ and the number of Rx beams is $N_R$, the UE may detect an optimal Tx/Rx beam pair by receiving an SSB set including of $N_T$ SSBs corresponding to each Tx beam, $N_R$ times.

Figure 2A:
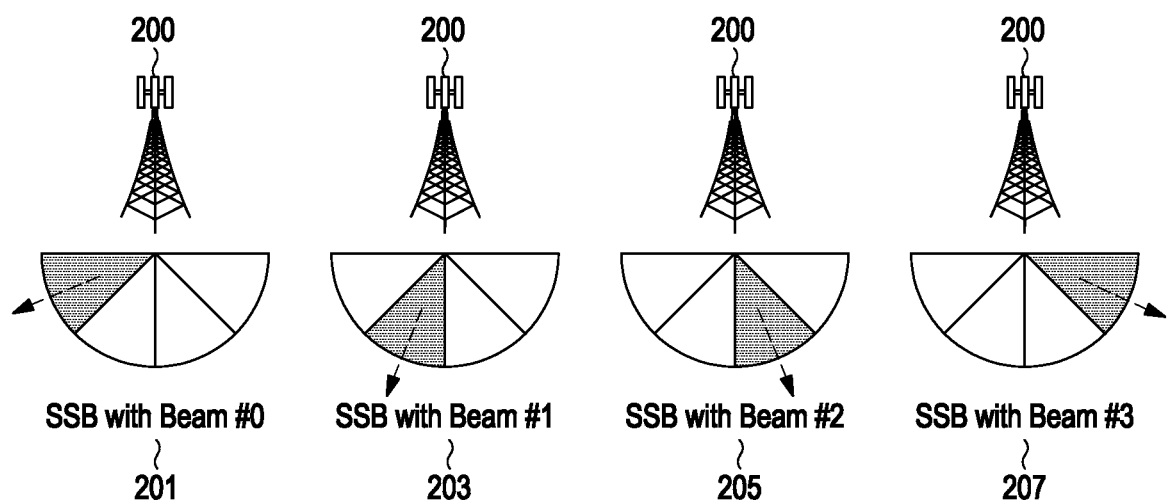
FIGS. 2A and 2B are diagrams illustrating an exemplary beam search operation for detecting an optimal transmission/reception beam pair.
Figure 2B:
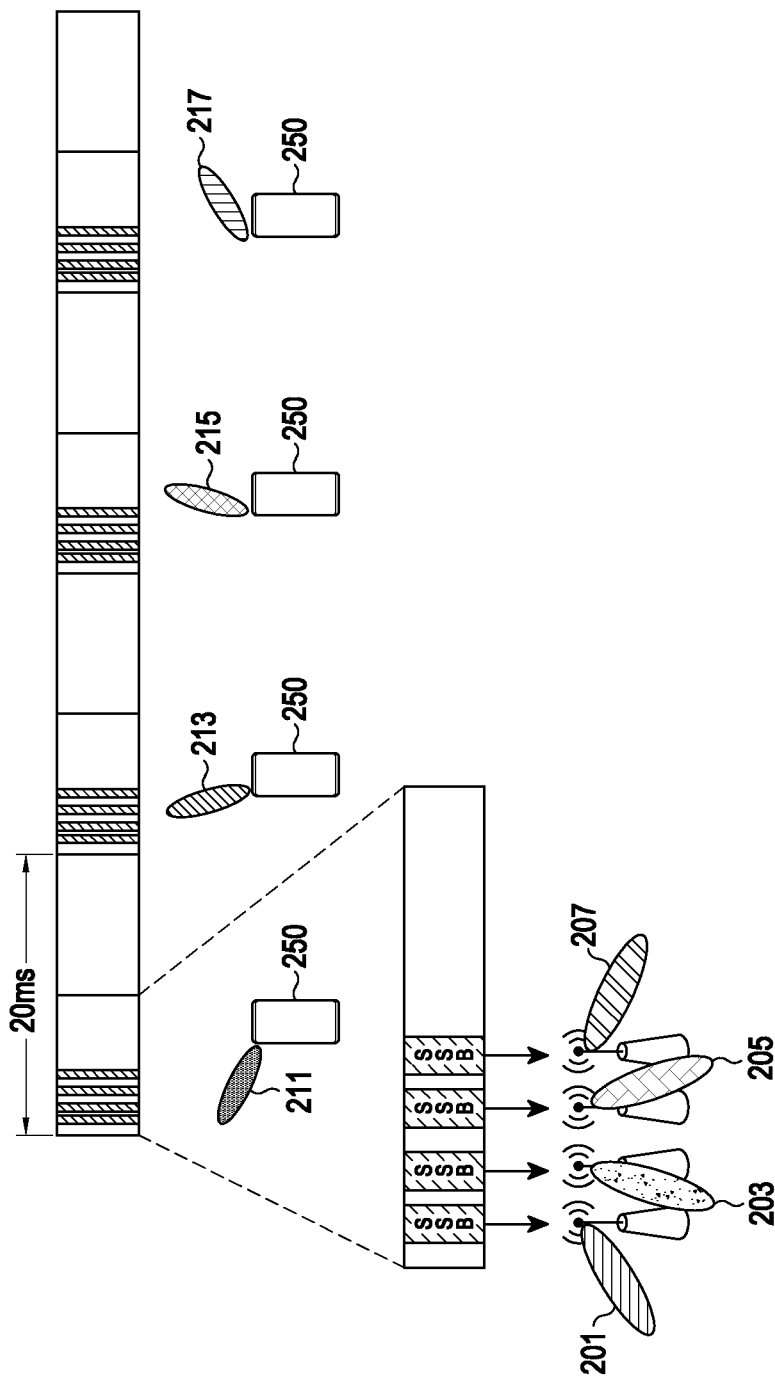

FIGS. 2A and 2B are diagrams illustrating an exemplary beam search operation for detecting an optimal Tx/Rx beam pair.

In the 5G system, a transmission period of an SSB set may be set, for example, in a range of 5 to 160 ms, and FIGS. 2A and 2B illustrate a case in which the transmission period of the SSB set is set to, for example, 20 ms. When an Rx beam changes, the UE repeatedly performs an operation of receiving the SSB set $N_R$ times. Given an SSB set transmission period of $T_{SSB}$, an Rx beam search time may be $N_R \times T_{SSB}$. FIG. 2A illustrates an exemplary operation of transmitting four SSBs 201, 203, 205, and 207 in an SSB set by Tx beams in different directions, for example, when a BS 200 operates Tx beams in four different directions. FIG. 2B illustrates an operation of receiving each SSB set by four different Rx beams 211, 213, 215, and 217 in different directions by a UE 250, when the BS 200 transmits the four SSBs 201, 203, 205, and 207 in a 20-ms period as illustrated in FIG. 2A. The UE 250 may perform a beam search operation of receiving an SSB set using the Rx beams 211, 213, 215, and 217 in different directions every 20-ms period and detecting, for example, an optimal Tx/Rx beam pair having a largest SSB reception signal strength. The above beam search operation may be applied in the same manner as or a similar manner to a 6G system supporting a THz band as well as the 5G system.

Regarding the above beam search operation, an operating frequency in the THz band is about 5 times higher than in the mmW band, and thus cell coverage is reduced to about ⅕ under the same conditions. For example, free space path loss is proportional to the square of a signal frequency. For example, a communication link at 280 GHz experiences an additional path loss of about 20 dB, compared to a communication link at 28 GHz. Nevertheless, severe path loss in the THz band may be overcome by using, for example, a very large antenna array or massive MIMO at the BS. In addition, since most of absorption lines for oxygen and water are located in the THz band, atmospheric absorption (for example, absorption by molecules in the air) in the THz band is generally more severe than at low frequencies. In order to actually design an efficient THz system, an accurate and tractable multipath channel model in the THz band should be developed for both indoor and outdoor environments. In this THz band, the size of a communication device is expected to be quite large relative to a wavelength and have high power loss or low efficiency. However, a lot of research is being conducted on the development of chip-scale THz technology, and as a result, current semiconductor technologies based on InP, GaAs, SiGe and even complementary metal-oxide-semiconductor (CMOS) may generate power with acceptable efficiency in the THz band. Therefore, a wireless communication technology using the THz band may be realized in the near future, and it is important to optimize a BF scheme in the THz band to provide a high dynamic range and high flexibility at reasonable cost and energy consumption.

Meanwhile, as one of methods of overcoming reduced cell coverage in the THz band, it may be considered to increase equivalent isotropic radiated power (EIRP) and an Rx antenna gain corresponding to antenna radiation power by increasing the number of antennas at a UE or BS in a BF system. However, when the number of antennas of the UE increases, the number $N_R$ of beams of the UE increases to, for example, tens or hundreds. When the SSB set transmission period $T_{SSB}$=20 ms, the Rx beam search time $N_R \times T_{SSB}$ increases so that a beam search time reaches several seconds. This causes problems not only in an initial cell search of the UE but also in the beam tracking performance of continuously searching for an optimal beam. In addition, since the number of RF chains increases with the number of antennas, additional issues arise in terms of heat generation, power consumption, power efficiency, and mounting. In general, most of methods discussed as beam search algorithms are to reduce the number of beams that a UE should search, using a wide beam at the UE. However, the number of antennas should be reduced to fundamentally double the beam width of the UE. Accordingly, Tx EIRP issues occur together with those called wide beams. For example, when the number of antennas at the UE is reduced by half to double the beam width of the UE, the output strength of a beam is reduced to ¼, causing a problem in cell coverage. In practice, a very difficult implementation issue may occur to obtain an appropriate strength decrease and an appropriate beam width increase for a wide beam. Therefore, a wide beam is currently used only for a short time during the initial search process of the UE.

In the 6G system, a THz band (e.g., 140 GHz, 160 GHz, or the like) may be used to secure a wide bandwidth. The THz band used in the 6G system may also include a higher frequency band than in an mmW band of frequency range (FR) 2 used in the 5G system in a broad sense. In wireless communication, the strength of a received signal is inversely proportional to the square of a wavelength, and as the wavelength is shorter, the diffraction property is weaker and it is more difficult to penetrate obstacles. High signal attenuation at a receiver resulting from such high frequency characteristics narrows the cell coverage of the 6G system, and the BF technology needs to be improved to overcome this problem. Various beams may be generated by changing the phase of an array antenna, and the 6G system may increase a propagation distance and coverage with a larger number of antennas and a narrower beam width for efficient communication in the THz band. When such a narrow beam width is used, efficient communication is possible only by detecting an optimal Tx/Rx beam pair by adjusting both the Tx beams of the BS and the Rx beams of the UE.

Hereinafter in the disclosure, the 5G system and the 6G system may be referred to as a first wireless communication system and a second wireless communication system, respectively, and the mmW band and the THz band may be referred to as a first frequency band and a second frequency band, respectively. A BS using the mmW band may be referred to as a first BS, and a BS using the THz band may be referred to as a second BS. In addition, the first and second BSs may be one or more BSs installed at a co-location to be described later.

The disclosure provides an efficient method of, when a Tx beam of a BS is given, detecting an Rx beam of a UE for the given Tx beam. Although the UE basically identifies signal strengths by sequentially using all available Rx beams in a beam search process, this beam search is not efficient in terms of time and power consumption. The disclosure proposes a so-called supplemental BF (SBF) technique which predicts the location and strength of an optimal Rx beam by searching a smaller number of Rx beams in consideration of different beam characteristics of a plurality of BSs installed at a co-location, that is, at the same location. In other words, when a Tx beam of the BS is given, the UE may select/determine an optimal Tx/Rx beam pair by searching a relatively small number of Rx beam(s) relative to all possible Rx beams in a 6G system using the SBF technique according to the disclosure. In the disclosure, the name of the SBF technique is an example, which should not be construed as limiting. According to the SBF technique of the disclosure, the location and strength of an optimal Rx beam in a THz band may be predicted by searching a smaller number of Rx beam(s) in consideration of different beam characteristics of two different BSs (e.g., a BS using an mmW band and a BS using the THz band) installed at a co-location, and the resulting reduction of power and time during Rx beam search of the UE may lead to improved beamforming performance of the UE. The two BSs installed at the co-location may be a single BS supporting both the mmW band and the THz band or a BS in the mmW band and a BS in the THz band which are installed at locations close enough to be seen as a co-location.

The disclosure also proposes a specific method of providing signaling information or control information to a UE, for application of the SBF technique. In describing the disclosure, higher layer signaling may be signaling corresponding to a combination of at least one following signaling.

MIB (Master Information Block)
SIB (System Information Block) or SIB X (X=1, 2, . . . )
RRC (Radio Resource Control)
MAC (Medium Access Control) CE (Control Element)

In addition, L1 signaling may be signaling corresponding to a combination of at least one of signaling methods using the following physical layer channels or signaling.

PDCCH (Physical Downlink Control Channel)
DCI (Downlink Control Information)
UE-specific (UE-specific) DCI
Group common DCI
Common DCI
Scheduling DCI (e.g., DCI used for the purpose of scheduling downlink or uplink data)
Non-scheduling DCI (e.g., DCI that is not for the purpose of scheduling downlink or uplink data)
PUCCH (Physical Uplink Control Channel)
UCI (Uplink Control Information)

The disclosure proposes a method of detecting an almost optimal Rx beam with a reduced search time and power consumption by receiving an SSB set Ns times fewer than $N_R$ times in consideration of different beam characteristics of one or more BSs installed at a co-location.

In the disclosure, BF performance may be enhanced in the 6G system by using two or more types of beams. To this end, a beam with a wider beam width than a beam provided by a serving cell and coverage comparable to the beam may be used.

Figure 3:
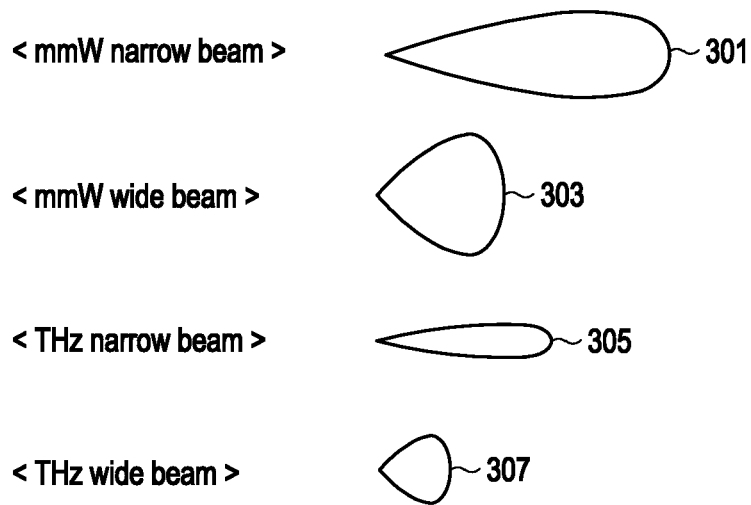
FIG. 3 is a diagram illustrating an example of an mmW-band beam and a THz-band beam.

FIG. 3 is a diagram illustrating an example of an mmW-band beam and a THz-band beam.

Referring to FIG. 3, an example of a narrow beam 301 and a wide beam 303 in the mmW band and a narrow beam 305 and a wide beam 307 in the THz band are illustrated. It may be noted that beams are formed narrower in the THz band than in the mmW band. In general, a beam implemented with a high frequency has a narrower beam width and a weaker beam strength than a beam implemented with a relatively low frequency. The same result will be seen from a comparison between beams with different frequencies in the mmW band. Therefore, when beams in different frequency bands are used, one type of beam may be excellent in terms of beam width and coverage, even though they are narrow. In the disclosure, embodiments will be described on the assumption that a narrow beam in the THz band and a narrow beam in the mmW band with a wider beam width or a greater signal strength than the narrow beam in the THz band are used, for convenience. However, embodiments of the disclosure are not limited to narrow beams.

In the disclosure, a UE may perform a beam search in the THz band based on a result of a beam search in the mmW band, and this beam search in the THz band will be referred to as a subset beam search. For the subset beam search, it is necessary to know a correlation between an mmW-band beam (hereinafter, referred to as an mmW beam) and a THz-band beam (hereinafter, referred to as a THz beam). In the disclosure, the subset relationship may be applied to an Rx beam of the UE performing a beam search. Beams in different frequency bands may generally be provided from different BSs. In order to know the correlation, the UE may be connected to two BSs providing different beams, and receive information. However, it is important from a usability point of view to enable the UE to operate even in a stand alone (SA) environment of the 3GPP standard and thus operate alone. Obviously, the UE may be enabled to operate more easily in a non-stand alone (NSA) environment.

To represent a correlation between two beams in different frequency bands, such as the mmW band and the THz band, information about one or more BSs installed at a co-location (hereinafter, referred to as SBF information) is defined in the disclosure. A co-location may mean that a plurality of BSs supporting the mmW band and the THz band, respectively are installed in geographical environments that may be regarded as a co-location. The co-location may mean that cell coverages overlap with each other to some extent. Because the distance between a BS and a UE is generally long, the co-location may not mean that the plurality of BSs installed at the co-location are at exactly the same location. In addition, when one BS supports both the mmW band and the THz band, the co-location may mean the same geographical location. For example, in the following situations 1-1) to 1-4), a co-location may be easily selected, and it may be sufficiently expected that a BS is installed at a co-location.

1-1) One BS supports both the mmW band and the THz band.
1-2) An mmW-band BS (cell) and a THz-band BS (cell) are installed at a co-location in a non-stand alone (NSA) 6G system.
1-3) Because of a relatively small coverage of the mmW band, there are a sufficiently large number of mmW cells to be co-located with a THz-band cell.
1-4) A place in which a BS is to be located is limited, such as a downtown area.

Figure 4:
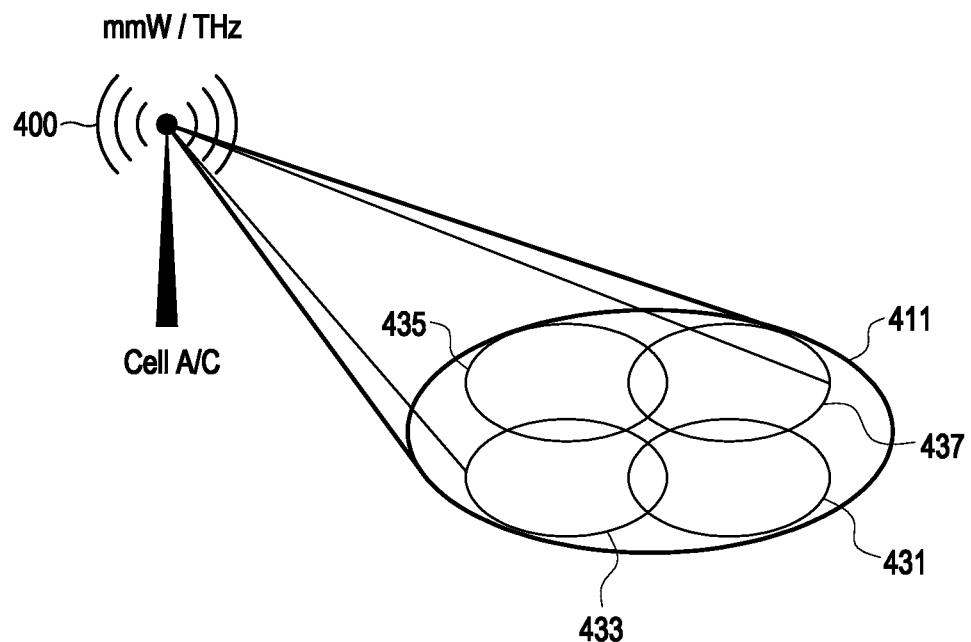
FIG. 4 is a diagram illustrating the cell coverage of a base station (BS) installed at a co-location to support an mmW band and a THz band according to an embodiment of the disclosure.

FIG. 4 is a diagram illustrating the cell coverage of a BS installed at a co-location to support an mmW band and a THz band according to an embodiment of the disclosure.

Referring to FIG. 4, a BS 400 installed at a co-location may be, for example, a single BS supporting both the mmW band and the THz band or a plurality of BSs supporting the mmW band and the THz band, respectively. The BS 400 installed at the co-location may form cell A in the mmW band and cell C in the THz band. FIG. 4 illustrates an example in which THz-band cell coverages 431, 433, 435, and 437 are included in an mmW-band cell coverage 411, the cell coverage 411 is formed by one Tx beam in the mmW band, and the four cell coverages 431, 433, 435, and 437 are formed by four Tx beams in the THz band.

In embodiments of the disclosure, the BS installed at the co-location may provide SBF information to a UE. When the BS installed at the co-location informs the UE through the SBF information that a beam is provided, the UE receiving the SBF information may assume that the signal strength of a beam from a BS supporting the THz band (hereinafter, referred to as a THz BS or a THz cell) is also great in a direction in which the signal strength of a beam from a BS supporting the mmW band (hereinafter, referred to as an mmW BS or an mmW cell) is great. Because the beam width of the mmW beam is wider than that of the THz beam, the disclosure proposes a method of detecting an optimal THz beam by searching for a THz beam within a coverage formed by the mmW beam.

The BS installed at the co-location may transmit SBF information, and the SBF information may be included and transmitted in an SSB. Specifically, the SBF information may be included, for example, in an MIB of the SSB, and in this case, a new field (referred to as an SBF field) for the SBF information may be included in the MIB. When the SBF information is transmitted in the MIB, the SBF information may be broadcast on a PBCH. The SBF information may indicate whether the BS installed at the co-location supports SBF. In addition, the SBF information may indicate a pair (i.e., correspondence) of an mmW BS and a THz BS that support SBF. [Table 4] below illustrates an exemplary MIB configuration including SBF information according to the disclosure.

TABLE 4

| 23 bit | 6 bit | systemFrameNumber | BIT STRING (SIZE (6)) |
|---|---|---|---|
| | 1 bit | subCarrierSpacingCommon | ENUMERATED {scs15or60, scs30or120} |
| | 4 bit | ssb-SubcarrierOffset | INTEGER (0 . . . 15) |
| | 1 bit | Dmrs-TypeA-Position | ENUMERATED {pos2, pos3} |
| | 8 bit | pdcch-ConfigSIB1 | PDCCH-ConfigSIB1 |
| | 1 bit | cellBarred | ENUMERATED {barred, notBarred} |
| | 1 bit | intraFreqReselection | ENUMERATED {allowed, notAllowed} |
| | 1 bit | spare | BIT STRING (SIZE (1)) |
| further | 2-3 bit | Supplemental Beamforming ID | |

Referring to [Table 4], the SBF information may be provided by an SBF ID and include, for example, 2 to 3 bits of information as in the example of [Table 4]. For example, when the SBF ID is configured as 3-bit information, it may indicate a value of 0 to 7 (i.e., 000 to 111). In this case, when an SBF ID field has a value of "0", it indicates that SBF is not supported. When the SBF ID field has a value of "1 to 7", it may indicate seven pairs of mmW BSs and THz BSs supporting SBF, separately. For example, when the SBF ID field indicates a value of "1", it may indicate a pair of mmW BS #1 and THz BS #1 supporting SBF. The SBF ID field including 3-bit information is an example. As the number of bits of the SBF ID field increases or decreases, the number of pairs of mmW BSs and THz BSs that support SBF may be increased or decreased. When the SBF ID field is configured as 1-bit information, it may indicate whether SBF is supported by the values of "0" and "1". Depending on the existence of the SBF ID field, for example, when the SBF ID field exists, SBF support may be indicated, and when the SBF ID field does not exist, SBF non-support may be indicated. In addition, when only SBF support is indicated by the SBF ID field, information about a pair of an mmW BS and a THz BS supporting SBF may be separately provided to the UE through the above-described higher layer signaling information or L1 signaling information. When the SBF information is provided through the MIB, the UE may obtain the SBF information without attaching to the BS installed at the co-location, and when the SBF information is provided through higher layer signaling information such as RRC information or L1 signaling information such as DCI, the UE may obtain the SBF information after attaching to the BS installed at the co-location.

In the disclosure, the UE may perform a beam search in the THz band based on a result of a beam search in the mmW band, and a subset beam search in the THz band is based on the premise that at least one THz beam within the coverage of an mmW beam may be included as a subset. Information about a correlation between the mmW beam and the THz beam may be extracted from beam book information preset in the UE, and in this case, the BS does not need to separately provide the beam book information to the UE. The beam book information may include/indicate, for example, the number of each mmW beam and a horizontal angle and/or vertical angle of the mmW beam, and the number of each THz beam and a horizontal angle and/or vertical angle of the THz beam as well. A plurality of THz beam indexes mapped to each mmW beam index may be configured in consideration of the beam widths and/or angles of the mmW beams and the THz beams, and various pieces of information that may indicate a correlation between the mmW beams and the THz beams may be used. In another embodiment, the beam book information may also be provided to the UE through higher layer signaling information. In the disclosure, the UE may detect an optimal Tx/Rx beam pair in the THz band by forming at least one THz beam belonging to a subset within the range of an mmW beam as an Rx beam, using the beam book information.

Figure 5:
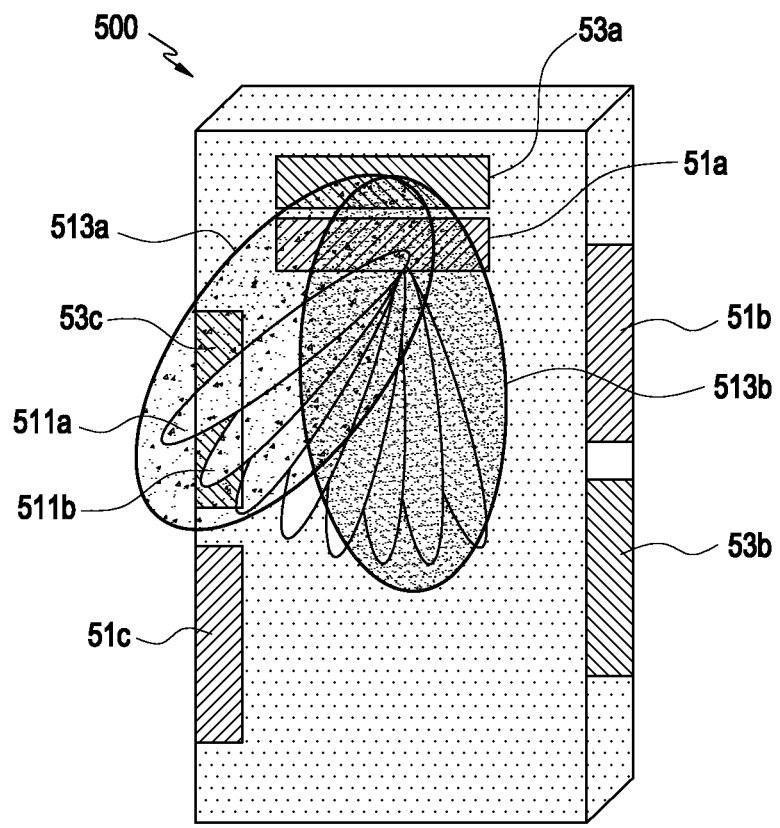
FIG. 5 is a diagram illustrating a beamforming operation in a user equipment (UE) supporting both an mmW band and a THz band according to an embodiment of the disclosure.

FIG. 5 is a diagram illustrating a BF operation at a UE supporting both an mmW band and a THz band according to an embodiment of the disclosure.

Figure 6A:
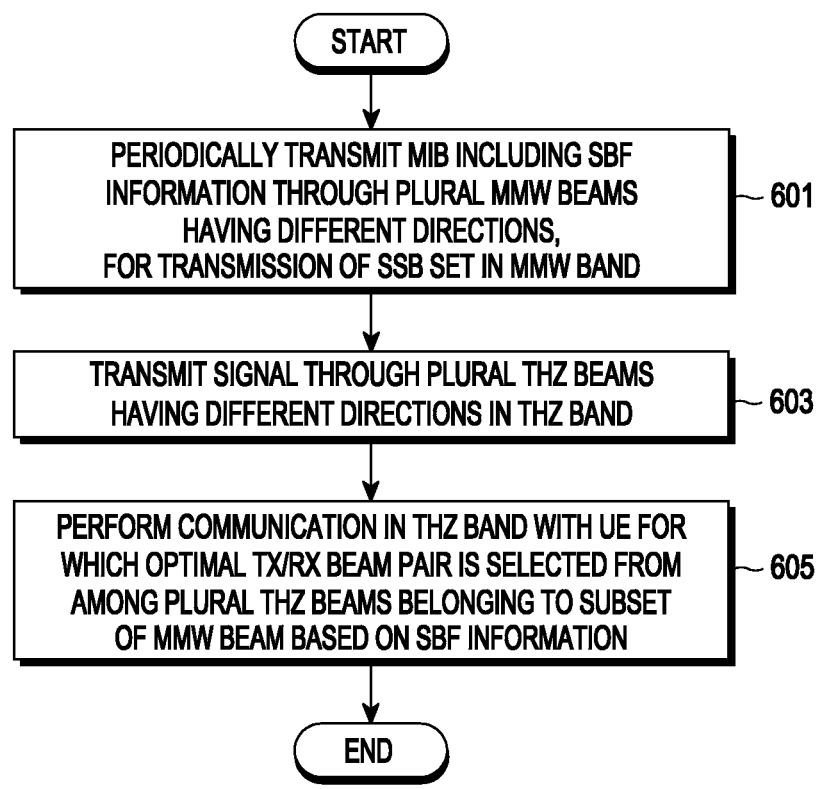
FIG. 6A is a flowchart illustrating a supplemental beamforming (SBF) operation performed by a BS installed at a co-location according to an embodiment of the disclosure.

Referring to FIG. 5, a UE 500 may include at least one THz module 51a, 51b, and 51c forming a plurality of THz beams 511a, 511b, . . . as Rx beams in the THz band and at least one mmW module 53a, 53b, and 53c forming a plurality of mmW beams 513a, 513b, . . . as Rx beams in the mmW band. As illustrated in the example of FIG. 5, it may be noted that the plurality of THz beams 511a, 511b, . . . are included as a subset within the range of each of the mmW beams 513a, 513b, . . . . While the plurality of THz modules 51a, 51b, and 51c and the plurality of mmW modules 53a, 53b, and 53c are shown for forming Rx beams to receive Tx beams transmitted in various directions in the example of FIG. 5, the UE may include one THz module and one mmW module. Each of the THz modules 51a, 51b, and 51c and the mmW modules 53a, 53b, and 53c may use a plurality of analog BF blocks that perform BF to form Rx beam(s) in the THz band or the mmW band. The configuration of the plurality of analog BF blocks may be implemented by including a plurality of analog phase shifters, PAs, and an antenna array connected to each RF chain, similarly to the block for processing the analog BF 132 described with reference to FIG. 1D. In another embodiment, each of the THz modules 51*a*, 51*b*, and 51*c* and the mmW modules 53*a*, 53*b*, and 53*c* may be implemented by including a block for processing at least one of digital BF or analog BF, as described with reference to FIG. 1D. FIG. 6A is a flowchart illustrating an SBF operation performed at a BS installed at a co-location according to an embodiment of the disclosure. As described above, the BS installed at the co-location may be a plurality of BSs supporting the mmW band and the THz band, respectively or a single BS supporting both the mmW band and the THz band at substantially the same location.

Referring to FIG. 6A, the BS installed at the co-location may periodically transmit an MIB including SBF information through a plurality of mmW beams in different directions, for transmission of an SSB set in the mmW band as illustrated in the example of FIGS. 2A and 2B, in step 601. The MIB including the SBF information may be transmitted in an SSB. In an embodiment of the disclosure, it is assumed that the MIB including the SBF information is transmitted from an mmW BS among BSs installed at the co-location or a single BS supporting both the mmW band and the THz band. In another embodiment, the MIB including the SBF information may be transmitted by a THz BS among the BSs installed at the co-location. In this case, the MIB including the SBF information is transmitted in the THz band.

In step 603, the BS installed at the co-location transmits a signal through a plurality of THz beams having different directions in the THz band. The signal transmitted through the THz beams may be various signals for a beam search in the THz band, and may be, for example, an SSB transmitted in the THz band.

In step 605, the BS installed at the co-location may perform communication in the THz band with a UE which has selected an optimal Tx/Rx beam pair from among a plurality of THz beams belonging to a subset of at least one mmW beam based on the SBF information.

Figure 6B:
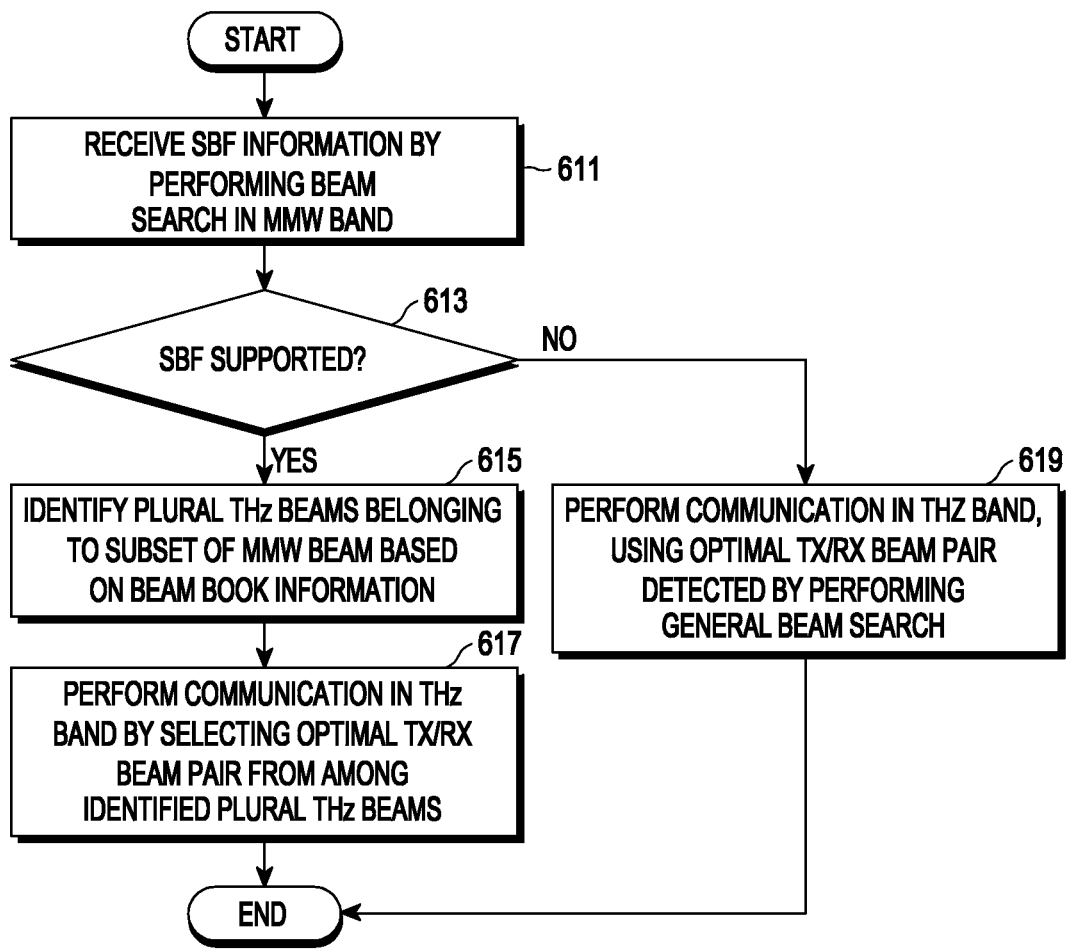
FIG. 6B is a flowchart illustrating an SBF operation performed by a UE according to an embodiment of the disclosure.

FIG. 6B is a flowchart illustrating an SBF operation performed by a UE according to an embodiment of the disclosure.

Referring to FIG. 6B, in step 611, the UE may receive a periodically transmitted SSB set by performing a beam search through beam sweeping of Rx beams in an mmW band, and receive SBF information in an MIB included in an SSB having a largest received signal strength, as described in FIG. 2B. An Rx beam through which the SBF information is received by the UE may be an optimal Rx beam in the mmW band for the UE. When the SBF information is obtained from the MIB in this manner, the UE may identify information about whether SBF is supported and information about a pair of an mmW BS and a THz BS supporting SBF from the SBF information without performing an attach procedure to a BS installed at a co-location.

In step 613, the UE identifies whether the BS installed at the co-location supports SBF from the received SBF information. In addition, when the SBF information is configured as illustrated in [Table 4], the UE may identify information about a pair of an mmW BS and a THz BS supporting SBF from the SBF information. When the BS installed at the co-location supports SBF, the UE may identify a BS for a THz beam search based on the information about the pair of the mmW BS and the THz BS in step 615. Further, the UE may identify a plurality of THz beams belonging to a subset of an mmW beam based on beam book information pre-stored in the UE or beam book information provided through higher layer signaling. In the disclosure, the subset relationship may be applied to an Rx beam of the UE performing a beam search in the BS installed at the co-location. In the disclosure, when the subset relationship is configured for Rx beams for a beam search of the UE in the THz band, an operation according to embodiments of the disclosure may be performed regardless of whether the BS configures the subset relationship for Tx beams. In a selective embodiment, the subset relationship may also be configured for the Tx beams of the BS. The BS installed at the co-location may transmit SSBs used for a beam search through THz Tx beams, while transmitting an SSB including SBF using mmW Tx beams. Similarly, the UE may receive the SSB including the SBF using an mmW Rx beam, and detect an optimal Tx/Rx beam pair in the THz band by searching THz Rx beams belonging to the subset of an mmW Rx beam having a largest received signal strength. In step 617, the UE selects an optimal Tx/Rx beam pair from among the identified plurality of THz beams and performs communication in the THz band. In this way, when the UE detects the optimal THz Rx beam by searching only the THz Rx beams belonging to the subset of the mmW Rx beam having the largest reception signal strength, time and power consumption required to detect the optimal THz Rx beam may be reduced.

When the BS installed at the co-location does not support SBF as a result of the identification in step 613, the UE performs communication in the THz band, using an optimal Tx/Rx beam pair detected by a general beam search in the THz band in step 619. In another embodiment, in step 619, the UE may perform communication using a wide beam by reducing the number of antennas for communication in the THz band, even if coverage is reduced, instead of the general beam search in the THz band. In the embodiment of FIG. 6B, when the BS always supports SBF, the operation of identifying whether SBF is supported may be omitted in step 613.

As in the above-described embodiment, the BS may add an SBF ID field to an SSB, that is, to an MIB transmitted on a PBCH, for informing the UE in the disclosure. Because the coverage of an mmW cell is wider than that of a THz cell, it is reasonable to provide SBF information first in the mmW cell. Although there is a cell ID provided by the SIB, for example, an SBF ID of 2 to 3 bits is used to map several adjacent mmW/THz BSs (cells) such that they are correlated and distinguish several other adjacent THz BSs (cells), unlike the cell ID. Therefore, the overhead of the SBF ID is less than that of, for example, a 36-bit cell ID provided by an SIB in the 5G system. In addition, since the MIB broadcasted from the BS carries only limited essential information, it may be burdensome to transmit additional information having a large number of bits in the MIB. Therefore, in another embodiment, the SBF ID may be provided in the SIB or transmitted through data or RRC information in a situation such as NSA, after an attach procedure of the UE.

Figure 7:
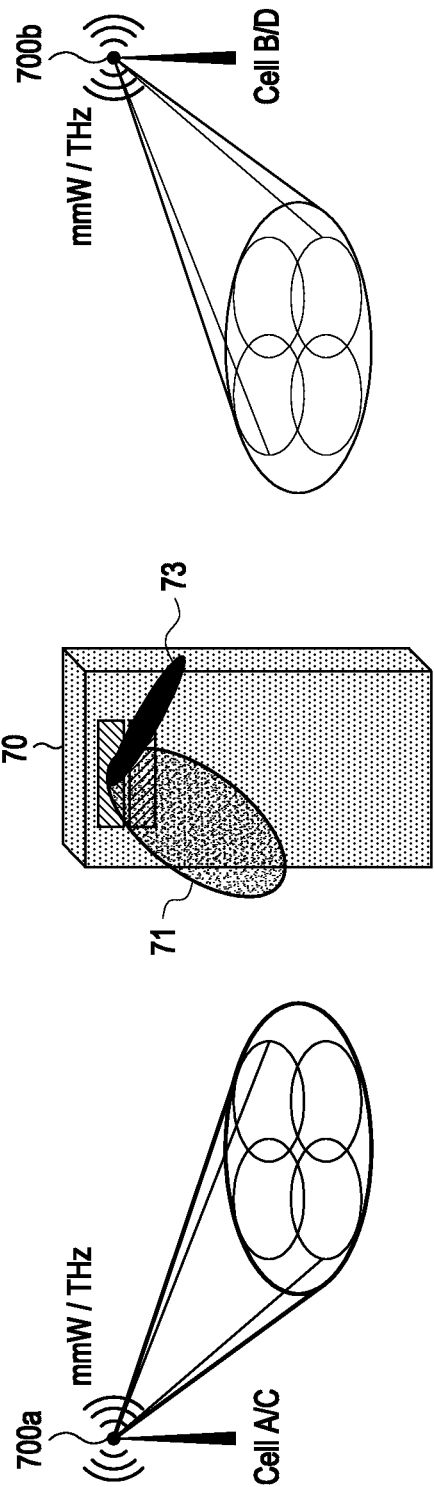
FIG. 7 is a diagram illustrating an operation of selecting a THz beam from a BS other than a BS installed at a co-location as an optimal beam according to an embodiment of the disclosure.

Meanwhile, since the UE operates in very various network environments, it may be difficult for the UE to use SBF even if a BS (cell) installed at a co-location according to the disclosure is provided in some cases. FIG. 7 illustrates an exemplary operation in this case.

FIG. 7 is a diagram illustrating an operation of selecting a THz beam of a BS other than a BS installed at a co-location as an optimal beam according to an embodiment of the disclosure. In the embodiment of FIG. 7, a BS 700*a* installed at a co-location forms mmW cell A and THz cell C, and another BS 700b installed at the co-location forms mmW cell B and THz cell D. A plurality of THz cells C and D may be formed, respectively, within the coverages of mmW cells A and B, as in the example of FIG. 4.

In the embodiment of FIG. 7, a UE 70 may identify SBF information provided by the BS 700a, and even when the UE 70 performs an SBF operation, the UE may select a THz beam of another BS 700b as an optimal beam. Even when the UE performs the SBF operation, the UE searches only THz beams belonging to a subset of an mmW beam based on a result of searching for the mmW beam because the coverage of the mmW beam is basically wider than the coverage of a THz beam. In this case, the UE is not capable of detecting an optimal THz beam transmitted from the BS 700b other than the BS 700a. To solve this problem, a method of also including SBF information in an SSB transmitted by a THz BS is proposed. In FIG. 7, the BS 700a may transmit SBF information using each of an mmW beam and a THz beam, and another BS 700b may also transmit SBF information using each of an mmW beam and a THz beam. The UE 70 may receive the SBF information from each of the BS 700a and the other BS 700b, using an mmW Rx beam 71 and a THz Rx beam 73. An SBF ID (e.g., "01") identified based on the SBF information transmitted from the BS 700a may be different from an SBF ID (e.g., "02") identified based on the SBF information transmitted from the other BS 700b. In this case, the UE may maintain the above SBF operation, detect a THz beam matching the SBF ID (e.g., "01") in the BS 700a, and use the THz beam as an optimal beam, or cancel the above SBF operation, detect a THz beam not matching the SBF ID (e.g., "2") in the other BS 700b, and use the THz beam as an optimal beam. Meanwhile, the SBF information transmitted by the THz BS may also be provided to the UE through an MIB or higher layer signaling information or L1 signaling information.

Figure 9:
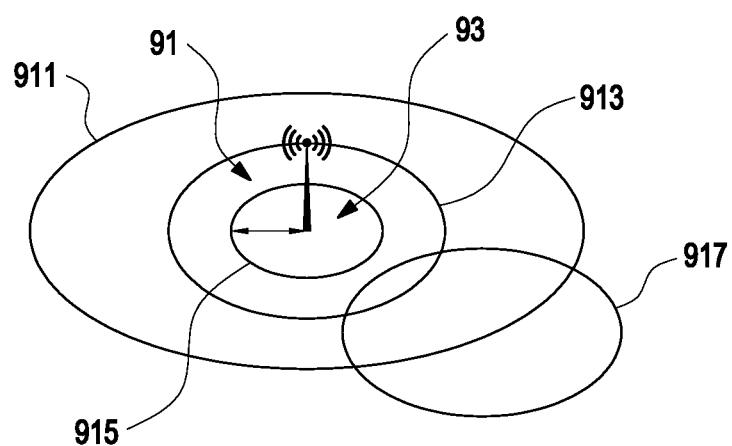
FIG. 9 is a diagram illustrating an example of the coverage of a serving cell of a BS supporting SBF, installed at a co-location and the coverage of a neighboring cell supporting only a THz band according to an embodiment of the disclosure.

The UE operates basically in various network environments, and because of the mobility of the UE, a handover function should be supported basically. Even in this case, even when a BS (cell) installed at the co-location is provided, it may be difficult to use SBF in some cases. When the UE intends to perform handover from a serving cell to a neighboring cell, an SBF operation may vary depending on the circumstances of the neighboring cell. FIG. 9 illustrates an exemplary operation in this case.

Figure 8:
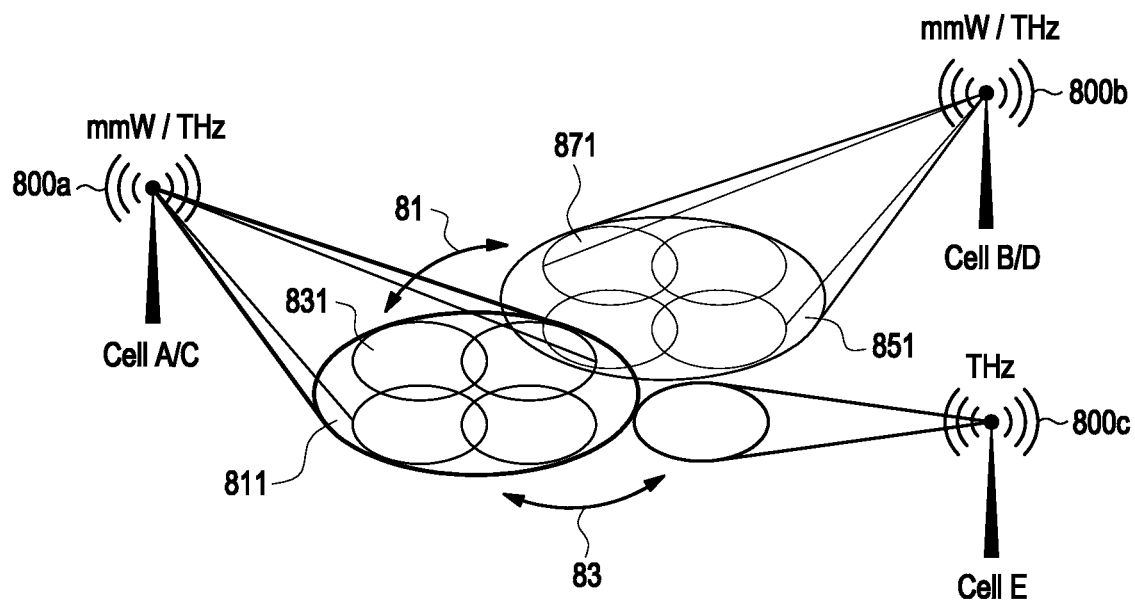
FIG. 8 is a diagram illustrating a beam search operation according to whether a BS of a neighboring cell is installed at a co-location when a UE requires according to an embodiment of the disclosure.

FIG. 8 is a diagram illustrating a beam search operation according to whether a BS of a neighboring cell is installed at a co-location, when handover of a UE is required in an embodiment of the disclosure. In the notation of cell X/Y in FIG. 8, X means a cell in an mmW band, Y means a cell in a THz band, and it is assumed that the coverage of the cell in the mmW band in the BS installed at the co-location includes the coverage of the cell in the THz band.

Referring to FIG. 8, a first BS 800a installed at a co-location forms cell A in an mmW band and cell C in a THz band, and cell coverages 831 in the THz band are included within a coverage 811 in the mmW band. A second BS 800b installed at the co-location forms cell B in the mmW band and cell D in the THz band, and cell coverages 871 in the THz band are included within a coverage 851 in the mmW band. A third BS 800c is not a BS installed at the co-location and forms only cell E in the THz band. It is assumed that the first, second and third BSs 800a, 800b, and 800c use the THz band of the same frequency.

As indicated by reference numeral 81 in the example of FIG. 8, when handover is required according to movement of a UE from the first BS 800a (cell A/C) installed at the co-location to the second BS 800b (cell B/D) installed at the co-location, the UE may secure good beam search performance while maintaining an SBF operation, because the second BS 800b also corresponds to a BS installed at the co-location. However, as indicated by reference numeral 83, when handover is required according to movement of the UE from the first BS 800a (cell A/C) installed at the co-location to the third BS 800c (cell E) supporting only the THz band, the UE may not maintain the SBF operation because the third BS 800c is not a BS installed at the co-location. In this case, the UE releases the SBF operation and performs a general beam search requiring a full search in the third BS 800c.

As such, when the network wants to support handover to a BS (cell) that does not support SBF, a reference point (or threshold) for determining whether to release the SBF operation may be provided to the UE. A reference signal received power (RSRP) (or a signal-to-noise and interference ratio (SNIR)) indicating the received signal strength of a signal may be used as the reference point (or threshold). Information about the reference point (or threshold) may be provided to the UE through the above-described higher layer signaling information or L1 signaling information. The UE connected to a serving cell may perform the SBF operation like the following 2-1) or 2-2) according to an SSB reception strength, that is, an SSB RSRP, $RSRP_{serv}$ of the serving cell, for example, using $RSRP_{Th}$ provided as information about the reference point (or threshold) as a reference. When the SSB RSRP, $RSRP_{serv}$ is equal to $RSRP_{Th}$, one of operations 2-1) and 2-2) below may be performed.

2-1) Area where THz SSB $RSRP_{serv}$>THz SSB $RSRP_{Th}$: SBF operation 2-2) Area where THz SSB $RSRP_{serv}$<THz SSB $RSRP_{Th}$: general full beam search operation FIG. 9 is a diagram illustrating an example of the coverage of a serving cell of a BS supporting SBF, installed at a co-location and the coverage of a neighboring cell supporting only a THz band according to an embodiment of the disclosure.

Referring to FIG. 9, the serving cell of the BS supporting SBF, installed at the co-location includes an mmW cell and a THz cell, and the coverage 911 of the mmW cell is larger than the coverage 913 of the THz cell. The BS installed at the co-location may adjust the size of an area 915 in which a UE may perform an SBF operation by adjusting $RSRP_{Th}$, which is a reference point (or threshold). When the area 915 in which the UE may perform the SBF operation is adjacent to the coverage 917 of the neighboring cell supporting only the THz band, the UE performs the SBF operation or the general full beam search according to the adjusted size of the area 915. As the value of $RSRP_{Th}$ increases, the size of the area 915 in which the SBF operation may be performed decreases, and as the value of $RSRP_{Th}$ decreases, the size of the area 915 in which the SBF operation may be performed may increase. That is, the value of $RSRP_{Th}$ and the size of the area 915 are inversely proportional. Therefore, the BS installed at the co-location may adjust handover performance that is in a trade-off relationship with the beam search performance of the UE by adjusting the value of $RSRP_{Th}$.

Figure 10:
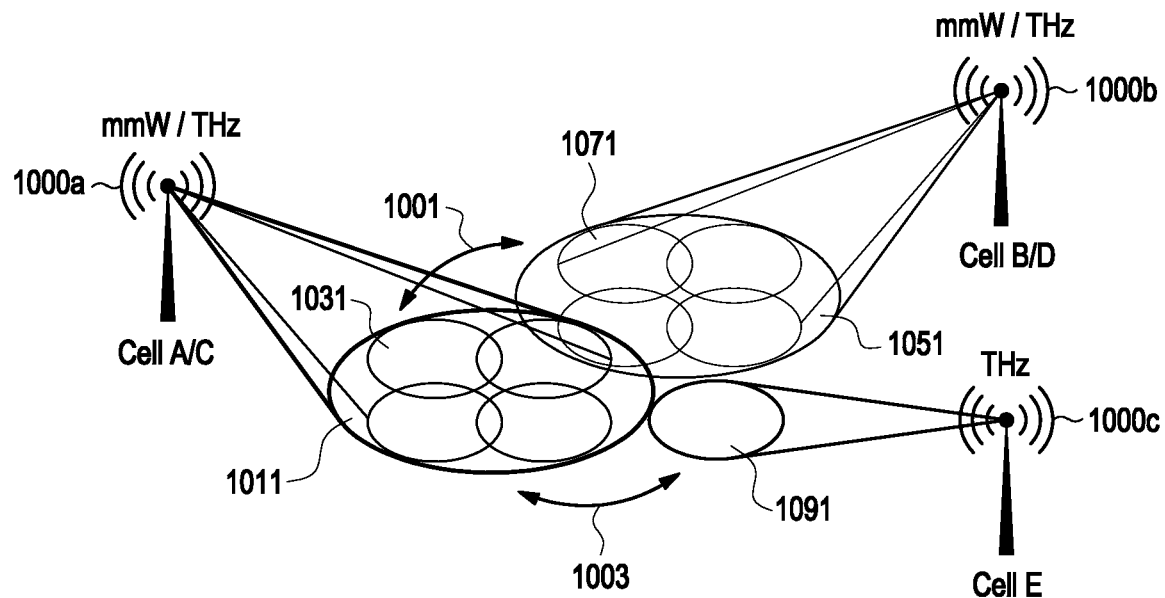
FIG. 10 is a diagram illustrating a measurement gap configuration according to whether a BS of a neighboring cell is installed at a co-location when a UE requires handover according to an embodiment of the disclosure.

Unlike the handover situation between BSs using the same frequency in the THz band as in the above embodiment, a method of supporting handover between BSs using different frequencies in the THz band may be required. FIG. 10 illustrates an exemplary operation in this case.

FIG. 10 is a diagram illustrating a measurement gap configuration according to whether a BS of a neighboring cell is a BS installed at a co-location, when handover of a UE is required according to an embodiment of the disclosure.

In the notation of cell X/Y in FIG. 10, X means a cell in the mmW band, and Y means a cell in the THz band. It is assumed that the coverage of a cell in the mmW band includes the coverage of a cell in the THz band in a BS installed at a co-location.

Referring to FIG. 10, a first BS 1000*a* installed at a co-location forms cell A in the mmW band and cell C in the THz band, and cell coverages 1031 in the THz band are included in the coverage 1011 of the mmW band. A second BS 1000*b* installed at the co-location forms cell B in the mmW band and cell D in the THz band, and cell coverages 1071 of the THz band are included in the coverage 1051 of the mmW band. A third BS 1000*c* is not a BS installed in co-location and forms only cell E in the THz band. In the embodiment of FIG. 10, it is assumed that the first BS 1000*a* as a serving cell and the second and third BSs 1000*b* and 1000*c* as neighboring cells use different frequencies in the THz band.

As indicated by reference numeral 1001 in the example of FIG. 10, when handover is required according to movement of a UE from the first BS 1000*a* (cell A/C) installed at the co-location to the second BS 1000*b* (cell B/D) installed at the co-location, the UE may perform a beam search, while maintaining an SBF operation, because the second BS 1000*b* also corresponds to a BS installed at the co-location. Further, when handover is required according to movement of the UE from the first BS 1000*a* (cell A/C) installed at the co-location to the third BS 1000*c* (cell E) supporting only the THz band as indicated by reference numeral 1003, the UE may not maintain the SBF operation because the third BS 1000*c* is not a BS installed at the co-location. In this case, the UE releases the SBF operation and performs a general beam search requiring a full search in the third BS 1000*c*.

In the example of FIG. 10, however, the THz band used by the first BS 1000*a* as the serving cell and the THz bands used by the second and third BSs 1000*b* as neighboring cells differ in frequency. Therefore, when handover is required, a measurement gap pattern for signal measurement of the second or third BS 1000*b* or 1000*c* may be indicated to the UE, so that a time for a neighbor cell search may be allocated to the UE. As in the 3GPP NR standard, the BS may provide information about a measurement length and a measurement period as information about the measurement gap pattern to the UE. However, as in the embodiment of the disclosure, the beam search performance of a neighboring cell is different depending on whether the UE performs the SBF operation. Therefore, the BS may transmit measurement gap pattern information separately in a case in which the SBF operation is performed and a case in which the SBF operation is not performed, and thus the network may be more efficiently operated. As more measurement gaps are allocated through the measurement gap pattern information, a time during which the UE may receive resources from the serving cell may decrease, and throughput performance of the UE may deteriorate. In the disclosure, when the THz band of a neighboring cell differs in frequency from the THz band of a serving cell, measurement gap pattern information may be provided separately according to whether the SBF operation is performed, as in operations 3-1) and 3-2) below. Measurement gap pattern information may be provided separately in the operations 3-1) and 3-2) below using higher layer signaling information or L1 signaling information by at least one of the serving cell or the neighboring cell.

3-1) When the neighboring cell is a BS installed at a co-location enabling an SBF operation, a short measurement length or long measurement period of a measurement gap is allocated.

3-2) When the neighboring cell is a BS that does not enable an SBF operation, a relatively large measurement length or short measurement period of a measurement gap is allocated.

For the BS installed at the co-location, the configuration of at least one of the measurement length or measurement period of a measurement gap may be adjusted. When the measurement length is adjusted, the measurement length is adjusted to be relatively short, and when the measurement period is adjusted, the measurement period is adjusted to be relatively long. For example, when the neighboring cell is a BS installed at a co-location enabling the SBF operation, the measurement period and measurement length of the measurement gap may be set to 40 ms and 3 ms, respectively (e.g., this means that 3 ms out of the 4 ms period is used to measure the neighboring cell), and when the neighboring cell is a BS that does not enable the SBF operation, as the measurement period of the measurement gap is shorter or the measurement length of the measurement gap is longer, the neighboring cell is searched at a higher rate. Therefore, the measurement period and measurement length of the gap may be set to, for example, 40 ms and 6 ms, respectively. As described above, when the neighboring cell is a BS installed at a co-location enabling the SBF operation, the beam search performance may be improved according to the disclosure, and thus the measurement ratio of the neighboring cell may be set to be relatively small by lengthening the measurement period or shortening the measurement length.

In addition, the measurement gap may be set on the basis of maintaining the beam search performance of the UE. For example, when a time required for the UE to perform a beam search on a neighboring cell by using SBF is half of a time required to detect an optimal value through a general full beam search, the BS may maintain the same handover performance even when in 3-1), the BS sets the measurement gap to a different value from that in 3-2), and the UE may obtain as large a gain in throughput as the decrement of the measurement gap.

Further, according to the disclosure, an mmW module of the UE may continuously operate in the background to assist a THz beam search during the SBF operation. In addition to the operation of detecting an SSB in the mmW band, the mmW module should perform a frequency scan operation in case that a frequency for receiving the SSB is not known, which causes a delay, and also should perform an intra/inter-cell measurement operation to search for a neighboring cell. This is because the operating frequency of the neighboring cell may be different from that of a current serving cell.

Information about the intra/inter-cell measurement may provide measurement object information in system information (e.g., SIB2 or SIB4) or an RRC message. However, when the UE operates by accessing only a cell in the THz band alone, not in the case of NSA/carrier aggregation (CA), in the SBF operation, the information about the intra/inter-cell measurement may not be provided to the UE in the above method. This is because the mmW module of the UE only searches for an SSB without attaching to a cell in the mmW band. In the 5G system, the UE needs random access to receive system information (e.g., SIB2 and SIB4). In the disclosure, to enable the mmW module of the UE to smoothly perform intra/inter-cell measurement, the measurement object information and so on may be provided by a cell (i.e., serving cell) of the THz band, instead.

Figure 11:
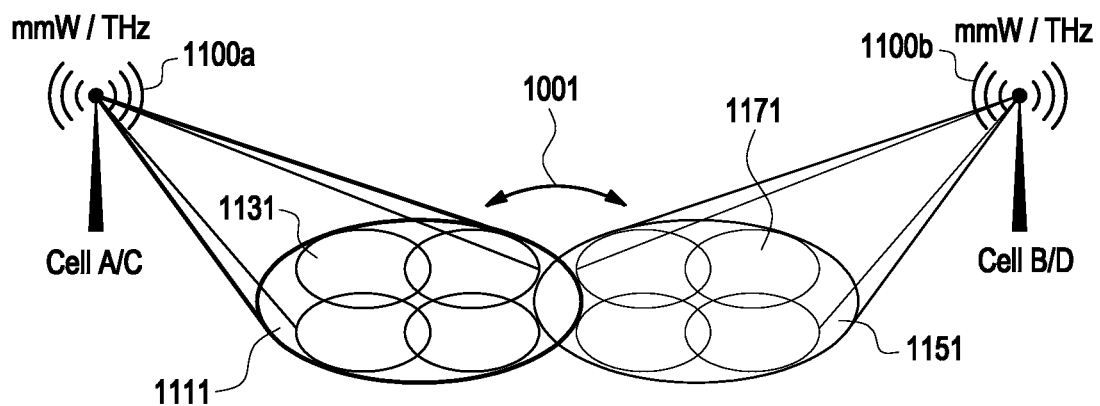
FIG. 11 is a diagram illustrating a method of providing information about intra/inter-cell measurement to a UE using SBF according to an embodiment of the disclosure.

FIG. 11 is a diagram illustrating a method of providing information about intra/inter-cell measurement to a UE using SBF according to an embodiment of the disclosure. In the notation of cell X/Y in FIG. 10, X means a cell in the mmW band, Y means a cell in the THz band, and it is assumed that the coverage of a cell in the mmW band includes the coverage of a cell in the THz band in a BS installed at a co-location.

Referring to FIG. 11, a first BS 1100a installed at a co-location forms cell A in an mmW band and cell C in a THz band, and cell coverages 1131 in the THz band are included in a coverage 1111 in the mmW band. A second BS 1100b installed at the co-location forms cell B in the mmW band and cell D in the THz band, and cell coverages 1171 in the THz band are included in a coverage 1151 in the mmW band. In FIG. 11, it is assumed that the first BS 1100a as a serving cell uses a frequency of 28 GHz in the mmW band, and the second BS 1100b as a neighboring cell uses a frequency of 39 GHz different from 28 GHz in the mmW band. As in the example of FIG. 11, when the second BS 1100b also supports SBF but uses a different frequency in the mmW band, the UE may need intra/inter-cell measurement information for smooth intra/inter-cell measurement. In the network situation as illustrated in FIG. 11, when the first BS 1100a configures a measurement object in RRC information about the THz band, it may provide information about the intra/inter-cell measurement to the UE in consideration of the second BS 1100b as a neighboring cell. Performing intra/inter-cell measurement in the UE also consumes time resources, and in the disclosure, the UE may perform intra/inter-cell measurement as in the following operations 4-1) and 4-2), for smooth connection in a THz cell (serving cell) (cell C or cell D).

4-1) When the signal quality of the THz cell (serving cell) (cell C) is good, the UE does not need to detect an intra/inter cell in the mmW band. In this case, when the signal length (RSRP or the like) of the THz cell (cell C) is equal to or less than a specific reference point (threshold), the mmW module of the UE performs intra/inter-cell measurement 4-2) Because the coverage of the mmW cell is larger than that of the THz cell, handover of the mmW cell from cell A to cell B may not be triggered even when handover 1001 of the THz cell from cell C to cell D occurs. In this way, when the THz cell handover 1001 occurs, information (command) for intra/inter-cell measurement in the mmW band is included in information about the intra/inter-cell measurement provided to the UE, for handover of the mmW cell.

The UE operations 4-1) and 4-2) described above may be possible in other ways. Even when the BS does not provide information about intra/inter-cell measurement separately to the UE, the operations 4-1) and 4-2) described above may be possible through a predetermined internal operation of the UE.

According to the afore-described embodiments of the disclosure, a BS installed at a co-location may provide SBF information that may reduce a beam search time of a UE in a THz band, and the UE may detect an optimum Tx/Rx beam pair in the THz band by searching only a smaller number of beams than in a general full beam search, using at least one mmW module and at least one THz module for beam searches in the mmW band and the THz band, simultaneously or in parallel, in a BF-based wireless communication system. In the disclosure, the mmW band and the THz band are not limited to specific bands, and various combinations of frequencies are available. In the disclosure, the SBF information may indicate a correlation between an mmW beam and a THz beam belonging to a subset of the mmW beam in the BS(s) installed at the co-location. The UE may receive the SBF information through an MIB without attaching to an mmW BS (i.e., SA). When the UE operates in connection to two BSs through NSA or CA, the UE may receive the SBF information from at least one of, for example, an mmW BS or a THz BS through higher layer signaling information or L1 signaling information. In the disclosure, the UE may selectively search for a THz Rx beam, using a subset relationship between a THz beam and an mmW beam through an optimal Rx beam detected through the mmW module, and the subset relationship means overlap between areas covered by beams formed by the mmW module and THz module of the UE. For example, when a plurality of THz beams cover between +/−10 degrees ahead of the rear of the UE, and a single mmW beam covers between +/−10 degrees ahead of the rear of the UE, these beams may be considered to be in the subset relationship.

Further, according to embodiments of the disclosure, when a BS installed at a co-location provides SBF information that may reduce a beam search time of a UE in a THz band, and the UE performs a beam search in the THz band based on a result of a beam search in an mmW band, a fallback criterion to allow the UE to perform a general beam search instead of an SBF operation may be set to thereby prevent malfunction of the UE, in a BF-based wireless communication system. For example, a pair of an mmW BS and a THz BS supporting SBF may be identified by configuring SBF information as an SBF ID. In this case, during the SBF operation according to the disclosure, the UE may perform the SBF operation only with two BSs (i.e., an mmW BS and a THz BS) having the same SBF ID, and fall back to the general beam search during a beam search in a BS with a different SBF ID, thereby preventing malfunction of the UE. It is also possible for the UE to use information about an mmW cell (a BS with a low frequency) relatively easy to detect by replacing an SBF ID with the ID of an mmW cell through a history of the UE or pre-obtained BS information. The SBF ID may be configured in a minimum number of bits so as not to burden a limited MIB. In addition, a reference point (threshold), $RSRP_{Th}$ is set as a release condition that the UE releases the SBF operation and falls back to the general beam search operation, so that the UE may search for a BS other than a BS installed at a co-location during handover. The release condition may include an SINR, a reference signal received quality (RSRQ), and so on as well as an RSRP, and information such as the RSRP/SINR/RSRQ of the mmW cell may also be considered. For example, a release condition that at least the RSRP of the mmW cell should be equal to or higher than a certain level may also be used.

In addition, according to embodiments of the disclosure, in a BF-based wireless communication system, when a BS installed at a co-location provides SBF information that may reduce a beam search time of a UE in a THz band, and the UE uses an mmW module and a THz module for beam searches, network utilization may be increased by setting different measurement gaps depending on whether a neighboring cell is a BS installed at a co-location enabling an SBF operation. In this case, it is possible to prevent degradation of throughput while maintaining the handover performance of the UE by inducing handover to the BS installed at the co-location and decreasing a measurement gap by as much as the improvement of beam search performance.

In addition, according to embodiments of the disclosure, in a BF-based wireless communication system, when a BS installed at a co-location provides SBF information that may reduce a beam search time of a UE in a THz band, and the UE uses an mmW module and a THz module for beam searches, a serving cell may provide information about intra/inter-cell measurement so that the UE does not perform an unnecessary frequency scan operation. In this case, the serving cell may provide intra/inter-cell measurement information about an mmW cell to the UE in consideration of a neighboring cell, when setting a measurement object.

In addition, according to embodiments of the disclosure, in a BF-based wireless communication system, when a BS installed at a co-location provides SBF information that may reduce a beam search time of a UE in a THz band, and the UE uses an mmW module and a THz module for beam searches, the UE may perform intra/inter-cell measurement using an mmW module in consideration of the state of a THz cell, which is a serving cell. In this case, the UE may perform intra/inter-cell measurement using the mmW module, when the signal strength (RSRP, RSRQ, SINR, or the like) of the THz cell is smaller than a specific reference point (threshold). In addition, in case that handover of a THz cell occurs, even when the SBF IDs of a THz cell to which handover is performed and an mmW cell are different, the UE may be allowed to perform intra/inter-cell measurement using the mmW module.

In addition, in the embodiments of the disclosure, when an SBF operation is performed in the form of dual-connectivity (DC) or CA instead of SA of the 6G system, mmW cell parameters transmitted instead by the serving cell in SA may be directly transmitted from an mmW cell to the UE.

When a UE uses SBF through the above embodiments of the disclosure, a beam search time of the UE in a THz band may be reduced. This means that the overall beam tracking performance of the UE is improved, and the frequency of beam failure may be reduced. According to embodiments of the disclosure, neighboring cell search performance of the UE may also be improved.

[Table 5] below compares a beam search time of the UE in the conventional full beam search with a beam search time of the UE using SBF according to the disclosure. The UE uses three THz modules and an mmW module for each of an mmW band and a THz band, by way of example, the UE requires more antennas in the THz band than in the mmW band. Therefore, the total number of beams searched by the UE is also larger in the THz band, and each search delay is calculated, for an SSB transmission period of, for example, 20 ms. Even though there are three THz modules and three mmW modules, as far as each module operates independently, only the number of beams corresponding to one module needs to be searched, and thus calculation results are described in the rightmost column. Referring to [Table 5] below, an initial search time is as long as about 4 seconds in the THz band in the existing full search method, whereas as many searches as the number of mmW beams and the number of THz beams in their subsets need to be performed in the SBF method of the disclosure, thereby improving the beam search performance. As a result, it may be identified that the beam search time in the THz band decreases by about ⅙ from about 4 seconds to 0.7 seconds. According to the disclosure, therefore, it may be noted that the beam search time in the THz band takes less than 1 second, like the beam search time in the mmW band.

TABLE 5

| | Ant. # | Moduele # | Total Beam # | Full search delay (SSB 20 ms) | Full search delay (SSB 20 ms & independent operation) |
| --- | --- | --- | --- | --- | --- |
| mmW UE | 4 | 3 | 21 | 420 ms | 140 ms |
| THz UE | 64 | 3 | 588 | 11760 ms | 3920 ms |

| ↓ | Ant. # | Subset # | Total Beam # | Full search delay (SSB 20 ms) | Full search delay (SSB 20 ms & independent operation) |
| --- | --- | --- | --- | --- | --- |
| Supplemental Beamforming | 64 | 28 | 49 | 980 ms | 700 ms (140 + 560) |

Figure 12A:
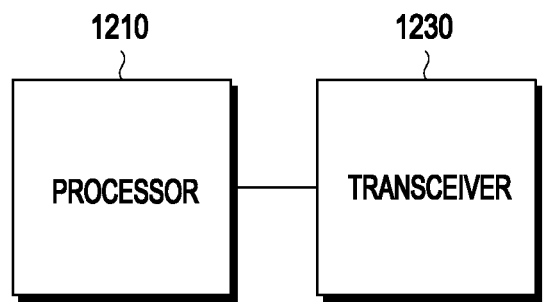
FIG. 12A is a diagram illustrating the configuration of a UE according to an embodiment of the disclosure.

FIG. 12A is a diagram illustrating the configuration of a UE according to an embodiment of the disclosure.

Referring to FIG. 12A, the UE may include a processor 1210, a transceiver 1230 including a receiver and a transmitter, and memory (not shown). The processor 1210 may be at least one processor and referred to as a controller or a control unit. The processor 1210 may provide overall control to the UE so that the UE operates according to a combination of at least one embodiment as well as each of the above embodiments. However, the components of the UE are not limited to the above-described example. For example, the UE may include more or fewer components than the aforementioned components. In addition, the transceiver, the memory, and the processor may be implemented in the form of at least one chip.

The transceiver 1230 may transmit and receive a signal to and from a BS by beamforming. The signal may include control information and data. To this end, the transceiver 1230 may include an RF chain that upconverts/downconverts the frequency of a transmission signal and amplifies the transmission signal, and block(s) that performs analog BF described with reference to FIG. 1D. Further, the transceiver 1230 may include at least one mmW module and at least one THz module as illustrated in FIG. 5. This is only an example of the configuration of the transceiver 1230, and the components of the transceiver 1230 are not limited to the above configuration. In addition, the transceiver 1230 may receive a signal through a radio channel, output the signal to the processor 1210, and transmit a signal output from the processor 1210 through a radio channel.

The memory may store programs and data required for operations of the UE. In addition, the memory may store control information or data included in signals transmitted and received by the UE. The memory may include a storage medium such as ROM, RAM, hard disk, CD-ROM, DVD, or a combination of the storage media. Further, there may be a plurality of memories.

In addition, the processor 1210 may control a series of processes so that the UE may perform an SBF operation according to each of the above-described embodiments of FIGS. 1 to 11 or a combination of two or more embodiments. The processor 1210 may include a block for performing digital BF described with reference to FIG. 1D and perform the afore-described hybrid BF through the transceiver 1230. The processor 1210 may perform a control operation on the component(s) of the UE by executing a program stored in the memory.

In addition, the processor 1210 may receive an SSB including SBF information about a BS installed at a co-location through the transceiver 1230 by performing a beam search using a plurality of first Rx beams in an mmW band, perform a beam search on a plurality of second Rx beams in a THz band belonging to a subset of a first Rx beam through which the SSB is received in the mmW band, based on the SPF information, and control to communicate with a BS in the THz band by selecting an optimal Tx/Rx beam pair as a result of the beam search on the plurality of second Rx beams through the transceiver 1230.

Figure 12B:
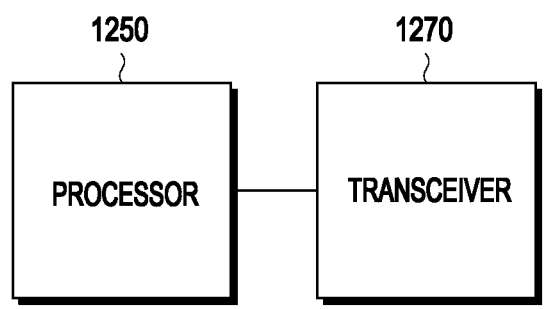
FIG. 12B is a diagram illustrating the configuration of a BS according to an embodiment of the disclosure.

FIG. 12B is a diagram illustrating the configuration of a BS according to an embodiment of the disclosure.

Referring to FIG. 12B, the BS may include a processor 1250, a transceiver 1270 including a receiver and a transmitter, and memory (not shown). The BS may also include a communication interface (not shown) for wired or wireless communication with another BS through a backhaul link. The processor 1250 may be at least one processor and referred to as a controller or a control unit. The processor 1250 may provide overall control to the BS so that the BS operates according to a combination of at least one embodiment as well as each of the above embodiments. However, the components of the BS are not limited to the above-described example. For example, the BS may include more or fewer components than the afore-mentioned components. In addition, the transceiver, the memory, and the processor may be implemented in the form of at least one chip.

The transceiver 1270 may transmit and receive a signal to and from a UE by beamforming. The signal may include control information and data. To this end, the transceiver 1230 may include an RF chain that upconverts/downconverts the frequency of a transmission signal and amplifies the transmission signal, and block(s) that performs analog BF described with reference to FIG. 1D. Further, the transceiver 1270 may include at least one mmW module and at least one THz module as illustrated in FIG. 5. This is only an example of the configuration of the transceiver 1270, and the components of the transceiver 1270 are not limited to the above configuration. In addition, the transceiver 1270 may receive a signal through a radio channel, output the signal to the processor 1250, and transmit a signal output from the processor 1250 through a radio channel.

The memory may store programs and data required for operations of the BS. In addition, the memory may store control information or data included in signals transmitted and received by the BS. The memory may include a storage medium such as ROM, RAM, hard disk, CD-ROM, and DVD, or a combination of the storage media. Further, there may be a plurality of memories.

In addition, the processor 1250 may control a series of processes so that the BS may support an SBF operation of the UE according to each of the above-described embodiments of FIGS. 1 to 11 or a combination of two or more embodiments. The processor 1250 may include a block for performing digital BF described with reference to FIG. 1D and perform the afore-described hybrid BF through the transceiver 1270. The processor 1250 may perform a control operation on the component(s) of the UE by executing a program stored in the memory.

In addition, the processor 1250 may transmit each of SSBs including SBF information about a BS installed at a co-location through the transceiver 1270 by a plurality of first Rx beams having different directions in an mmW band, and control to communicate with a UE for which an optimal Tx/Rx beam pair in a THz band having a higher frequency than the mmW band is determined based on the SBF information, using a Tx beam in the THz band through the transceiver 1270.

Methods according to the claims of the disclosure or the embodiments described in the specification may be implemented in hardware, software, or a combination of hardware and software.

When the methods are implemented in software, a computer-readable storage medium or computer program product storing at least one program (software module) may be provided. The at least one program stored in the computer-readable storage medium or computer program product is configured to be executable by at least one processor in an electronic device. The at least one program includes instructions that cause the electronic device to perform the methods according to the claims or the embodiments of the disclosure.

The program (software module or software) may be stored in random access memory (RAM), non-volatile memory including flash memory, ROM, electrically erasable programmable ROM (EEPROM), a magnetic disc storage device, a compact disc-ROM (CD-ROM), digital versatile disc (DVD), any other type of optical storage device, or a magnetic cassette. Alternatively, the program may be stored in memory configured as a combination of some or all of them. In addition, each constituent memory may be plural in number.

Further, the program may be stored in an attachable storage device accessible through a communication network such as the Internet, an intranet, a local area network (LAN), a wide LAN (WLAN), or a storage area network (SAN), or a combination thereof. Such a storage device may be connected to a device implementing an embodiment of the disclosure through an external port. Further, a separate storage device on the communication network may be connected to the device implementing the embodiment of the disclosure.

In the specific embodiments of the disclosure described above, elements included in the disclosure are expressed in singular or plural forms according to the specific embodiments. However, the singular or plural expression is appropriately selected in the context for convenience of description, and the disclosure is not limited to the singular or plural components. Even if a component is expressed as plural, it may be singular. Even a component expressed as singular may be plural in number.

The embodiments of the disclosure disclosed in the specification and drawings are merely presented as specific examples to easily explain the technical ideas of the disclosure and help the understanding of the disclosure, and are not intended to limit the scope of the disclosure. That is, it is apparent to those skilled in the art that other modifications can be made based on the technical spirit of the disclosure. In addition, the above embodiments may be operated in combination as needed. For example, a BS and a UE may be operated in a combination of parts of different embodiments of the disclosure.

Other modifications based on the technical ideas of the above embodiments may be implemented.

Meanwhile, the order of descriptions in the drawings that illustrate the method of the disclosure does not necessarily correspond to the order of execution, and the order of precedence may be changed or parallel execution may be possible.

Alternatively, the drawings illustrating the method of the disclosure may include only some components without other components without departing from the scope and spirit of the disclosure.

In addition, the method of the disclosure may be executed by combining some or all of the contents included in each embodiment without departing from the scope and spirit of the disclosure.

Various embodiments of the disclosure have been described above. The foregoing description of the disclosure is for illustrative purposes, and the embodiments of the disclosure are not limited to the disclosed embodiments. Those skilled in the art will understand that modifications can be made easily into other specific forms without changing the subject matter of the disclosure. The scope of the disclosure is defined by the following claims rather than the detailed description above, and all changes or modifications derived from the meaning and scope of the claims and their equivalent concepts should be construed as encompassed in the scope of the disclosure.

The invention claimed is:

1. A communication method of a base station (BS) in a beamforming-based wireless communication system supporting a plurality of frequency bands, the communication method comprising:
   transmitting each of synchronization signal blocks (SSBs) including first information about a BS installed at a co-location through a plurality of first transmission beams having different directions in a first frequency band; and
   performing, using a transmission beam in a second frequency band, communication with a user equipment (UE) for which an optimal transmission/reception beam pair in the second frequency band having a higher frequency than the first frequency band is determined based on the first information.

2. The communication method of claim 1, wherein the first information about the BS installed at the co-location indicates whether a subset beam search method enabling a beam search in the second frequency band based on a result of a beam search in the first frequency band is supported.

3. The communication method of claim 1, wherein the first information further indicates a pair of first and second BSs forming the first and second transmission beams in the first and second frequency bands, respectively,
   wherein the first BS is a BS of a millimeter wave (mmW) band, and the second BS is a BS of a terahertz (THz) band, and
   wherein the first and second BSs are different BSs included in the BS installed at the co-location or geographically close to each other.

4. The communication method of claim 1, further comprising transmitting second information including a threshold for a signal strength of a serving cell, used to determine whether to release a beam search operation based on the first information in the second frequency band.

5. The communication method of claim 4, further comprising transmitting third information indicating a measurement gap differentiated according to whether the beam search operation based on the first information in the second frequency band is supported,
   wherein a setting of at least one of a measurement length or a measurement period of the measurement gap is adjusted for a cell of the BS installed at the co-location, which supports the beam search operation based on the first information in the second frequency band, when the measurement length is adjusted, the measurement length is adjusted to be relatively short, and when the measurement period is adjusted, the measurement period is adjusted to be relatively long.

6. A base station (BS) in a beamforming-based wireless communication system supporting a plurality of frequency bands, the BS comprising:
   a transceiver; and
   a processor configured to transmit each of synchronization signal blocks (SSBs) including first information about a BS installed at a co-location through a plurality of first transmission beams having different directions in a first frequency band, through the transceiver, and perform, using a transmission beam in a second frequency band through the transceiver, communication with a user equipment (UE) for which an optimal transmission/reception beam pair in the second frequency band having a higher frequency than the first frequency band is determined based on the first information.

7. The BS of claim 6, wherein the first information about the BS installed at the co-location indicates whether a subset beam search method enabling a beam search in the second frequency band based on a result of a beam search in the first frequency band is supported.

8. A communication method of a user equipment (UE) in a beamforming-based wireless communication system supporting a plurality of frequency bands, the communication method comprising:
   receiving a synchronization signal block (SSB) including first information about a base station (BS) installed at a co-location by performing a beam search using a plurality of first reception beams in a first frequency band;
   performing a beam search on a plurality of second reception beams in a second frequency band belonging to a subset of a first reception beam through which the SSB is received in the first frequency band, based on the first information; and
   communicating with the BS in the second frequency band by selecting an optimal transmission/reception beam pair as a result of the beam search on the plurality of second reception beams.

9. The communication method of claim 8, further comprising identifying whether a subset beam search method enabling a beam search in a second frequency band having a higher frequency than the first frequency band is supported, based on the first information,
   wherein each of the plurality of first reception beams in the first frequency band includes a plurality of second reception beams in the second frequency band as a subset, and
   wherein the first information indicates whether the subset beam search method enabling the beam search in the second frequency band based on a result of the beam search in the first frequency band is supported.

10. The communication method of claim 8, wherein the first information further indicates a pair of first and second BSs forming first and second transmission beams in the first and second frequency bands, respectively,
   wherein the first BS is a BS of a millimeter wave (mmW) band, and the second BS is a BS of a terahertz (THz) band, and
   wherein the first and second BSs are different BSs included in the BS installed at the co-location or geographically close to each other.

11. The communication method of claim 8, further comprising receiving, from the BS, second information including a threshold for a signal strength of a serving cell, used to determine whether to release a beam search operation based on the first information in the second frequency band.

12. The communication method of claim 11, further comprising receiving, from the BS, third information indicating a measurement gap differentiated according to whether the beam search operation based on the first information in the second frequency band is supported,
   wherein a setting of at least one of a measurement length or a measurement period of the measurement gap is adjusted for a cell of the BS installed at the co-location, which supports the beam search operation based on the first information in the second frequency band, when the measurement length is adjusted, the measurement length is adjusted to be relatively short, and when the measurement period is adjusted, the measurement period is adjusted to be relatively long.

13. A user equipment (UE) in a beamforming-based wireless communication system supporting a plurality of frequency bands, the UE comprising:
   a transceiver; and
   a processor configured to receive a synchronization signal block (SSB) including first information about a base station (BS) installed at a co-location by perform a beam search using a plurality of first reception beams in a first frequency band, through the transceiver, perform a beam search on a plurality of second reception beams in a second frequency band belonging to a subset of a first reception beam through which the SSB is received in the first frequency band, based on the first information, and communicate with the BS in the second frequency band by selecting an optimal transmission/reception beam pair as a result of the beam search on the plurality of second reception beams, through the transceiver.

14. The UE of claim 13, wherein the processor is configured to identify whether a subset beam search method enabling a beam search in a second frequency band having a higher frequency than the first frequency band is supported, based on the first information,
   wherein each of the plurality of first reception beams in the first frequency band includes a plurality of second reception beams in the second frequency band as a subset, and wherein the first information indicates whether the subset beam search method enabling the beam search in the second frequency band based on a result of the beam search in the first frequency band is supported.

* * * * *